US006836701B2

(12) United States Patent
McKee

(10) Patent No.: US 6,836,701 B2
(45) Date of Patent: Dec. 28, 2004

(54) AUTONOMOUS MULTI-PLATFORM ROBOTIC SYSTEM

(75) Inventor: Robert Nolan McKee, Aurora, OH (US)

(73) Assignee: Royal Appliance Mfg. Co., Glenwillow, OH (US)

(*) Notice: Subject to any disclaimer, the term of this patent is extended or adjusted under 35 U.S.C. 154(b) by 0 days.

(21) Appl. No.: 10/417,152

(22) Filed: Apr. 16, 2003

(65) Prior Publication Data

US 2003/0212472 A1 Nov. 13, 2003

Related U.S. Application Data

(60) Provisional application No. 60/379,530, filed on May 10, 2002.

(51) Int. Cl.[7] .............................................. G06F 19/00
(52) U.S. Cl. ...................... 700/245; 700/250; 700/253; 700/257; 700/258; 700/259; 700/264; 318/568.11; 318/568.12; 318/568.13; 318/568.16; 318/568.21; 318/587; 701/1; 701/3; 701/23; 701/24; 701/25; 701/26; 701/120; 701/123; 701/200; 701/207; 701/215; 701/300; 701/301; 701/308
(58) Field of Search ............................ 701/1, 120, 123, 701/200, 207, 215, 24, 25, 26, 3, 300, 301, 208; 700/245, 250, 253, 257, 258, 259, 264; 318/568.11, 568.12, 568.13, 568.16, 568.21, 587

(56) References Cited

U.S. PATENT DOCUMENTS

| | | | |
|---|---|---|---|
| 5,220,263 A | 6/1993 | Onishi et al. | |
| 5,341,540 A | 8/1994 | Soupert et al. | |
| 5,659,779 A | 8/1997 | Laird et al. | |
| 6,374,155 B1 | 4/2002 | Wallach et al. | |
| 6,389,329 B1 | 5/2002 | Colens | |
| 6,496,755 B2 * | 12/2002 | Wallach et al. | 700/245 |
| 6,507,773 B2 * | 1/2003 | Parker et al. | 700/258 |
| 6,532,404 B2 | 3/2003 | Colens | |
| 6,535,793 B2 | 3/2003 | Allard | |
| 2002/0040271 A1 | 4/2002 | Park et al. | |
| 2002/0153184 A1 | 10/2002 | Song et al. | |
| 2002/0174506 A1 | 11/2002 | Wallach et al. | |
| 2002/0193908 A1 * | 12/2002 | Parker et al. | 700/258 |

FOREIGN PATENT DOCUMENTS

| WO | WO 01/82766 | 11/2001 |
|---|---|---|
| WO | WO 02/074150 | 9/2002 |

* cited by examiner

*Primary Examiner*—Thomas G. Black
*Assistant Examiner*—McDieunel Marc
(74) *Attorney, Agent, or Firm*—Fay, Sharpe, Fagan, Minnich & McKee, LLP

(57) ABSTRACT

An autonomous multi-platform robot system (100, 1100) for performing at least one functional task in an environment is provided. The system includes at least one navigator platform (110, 1110) providing mapping, localization, planning, and control functions for itself and at least one other platform within the environment and at least one functional robot platform (120, 1120) in communication with one or more navigator platforms for performing one or more functional tasks. In one embodiment, one or more navigator platforms (1110) are stationary and include sensors (202) for sensing information about the environment. In another embodiment, one or more functional robot platforms (1120) include sensors (304) for sending information about the environment. In still another embodiment, the system includes one or more stationary platforms (124) with sensors (310) for sensing information about the environment.

21 Claims, 23 Drawing Sheets

AUTONOMOUS MULTI-PLATFORM ROBOTIC SYSTEM

This application claims the benefit of U.S. Provisional Application Ser. No. 60/379,530, filed on May 10, 2002, the disclosure of which is incorporated herein by reference.

BACKGROUND OF INVENTION

The invention relates to mobile robot systems. It finds particular application in conjunction with a system and method for allocating mapping, localization, planning, control and task performance functions in an autonomous multi-platform robot environment and will be described with particular reference thereto. However, it is to be appreciated that the invention is also amenable to other applications.

Mobile robots have been designed, developed and deployed to handle a variety of tasks such as cleaning and security. Most mobile robots are non-autonomous; that is, they are unable to autonomously navigate. The economic benefits provided by non-autonomous robots are limited by the inflexible behavior of the robots and their extensive installation costs. Skilled technicians often must be hired and paid to preprogram the robots for specific routes and tasks. It may be necessary to install objects in the environment to guide the robots, such as tracks, buried signal emitting wires, markers or sensors. Further modifications to the environment may also be necessary to minimize installation and operational problems.

Some mobile non-autonomous robots can detect obstacles blocking their paths, and can stop or deviate slightly from their paths to avoid such obstacles. If the environment is modified significantly, however, such as by moving a large item of furniture, conventional non-autonomous robots do not properly react. Part or all of the installation process often must be repeated. Given this limitation, non-autonomous robots are usually deployed only on stable and high value routes. Though some non-autonomous robots rely on random motion to perform their tasks, such as pool cleaning robots, only a limited number of applications are amenable to this approach.

Fully autonomous mobile robots have begun to emerge from research laboratories during the past few years. Autonomous robots are able to navigate through their environment by sensing and reacting to their surroundings and environmental conditions. Autonomous robot navigation involves four primary tasks: mapping, localization, planning and control. These closely related concepts are analogous to asking the questions "Where am I?" (mapping and localization), followed by "Where do I want to be?" or "What do I want to do?" (planning), and finally, "How do I get there?" or "How do I do that?" (control).

Once mapping is complete, the robot's current position, orientation and rate of change within the map must be determined. This process is referred to as localization. Autonomous robots that rely on 2D mapping and localization are often not able to navigate with adequate reliability due to the relative simplicity of the map. Often, the robots become lost, stuck or fall. Use of dynamic 3D mapping and localization, by contrast, permits navigation that is more reliable but involves complex calculations requiring a large amount of computational overhead. 3D maps typically have millions of cells, making straightforward operations such as landmark extraction, localization and planning computationally intensive. The resulting computational delays limit the speed of robot movement and task performance.

Once mapping and localization are accomplished, task planning and performance must be undertaken. Some localization will still be required during task performance. With one robot attempting to localize while performing tasks leads to unacceptable delays. If multiple robots are used, the tradeoffs described above are often still present, and must now be dealt with multiple times over.

U.S. Pat. No. 6,374,155 to Wallach et al. discloses an autonomous mobile robot system that allocates mapping, localization, planning, and control functions to at least one navigator robot and allocates task performance functions to one or more functional robots. The at least one navigator robot maps the environment, localizes itself and the functional robots within the map, plans the tasks to be preformed by the at least one functional robot and controls and tracks the at least one functional robot during task performance. The at least one navigator robot performs substantially all calculations for mapping, localization, planning and control for both itself and the functional robots. In one implementation, the at least one navigator robot remains stationary while controlling and moving the at least one functional robot platform in order to simplify localization calculations. In one embodiment, the at least one navigator robot, whether mobile or stationary, is equipped with sensor processing hardware to perform substantially all calculations for mapping, localization, planning, and control required for these tasks, while the at least one functional robot is equipped with various sensors or hardware employed for calculation purposes. The at least one functional robot transmits date from the sensors to the at least one navigator robot so that the navigator can process the data for its calculations.

BRIEF SUMMARY OF INVENTION

In view of the above, an autonomous, multi-robot system having fast, accurate and cost effective mapping and localization, as well as effective planning and allocation of tasks with improving sensing of the environment is needed.

In one aspect, the invention provides an autonomous multi-platform robot system for performing at least one functional task in an environment. In one embodiment, the system includes at least one navigator platform providing mapping, localization, planning, and control functions for itself and at least one other platform within the environment and at least one functional robot platform in communication with one or more navigator platforms for sensing information about the environment.

In another embodiment, the system includes a navigator platform providing mapping, localization, planning, and control functions for itself and other platforms within the environment, one or more functional robot platforms in communication with the navigator platform for performing one or more functional tasks, and one or more stationary sensor platforms in communication with the navigator platform for sensing information about the environment.

In still another embodiment, the system includes at least one stationary navigator platform for sensing information about the environment and providing mapping, localization, planning, and control functions for itself and at least one other platform within the environment and at least one functional robot platform in communication with one or more navigator platforms for performing the functional task(s).

The system provides near real-time maneuvering and task completion. One application of the invention is in household or office cleaning, which typically involves multiple and repetitive tasks such as vacuuming, sweeping and mopping. The invention, however, could be implemented in any environment where one or more robots are maneuvered to perform assigned tasks.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION OF INVENTION

Figure 1A:
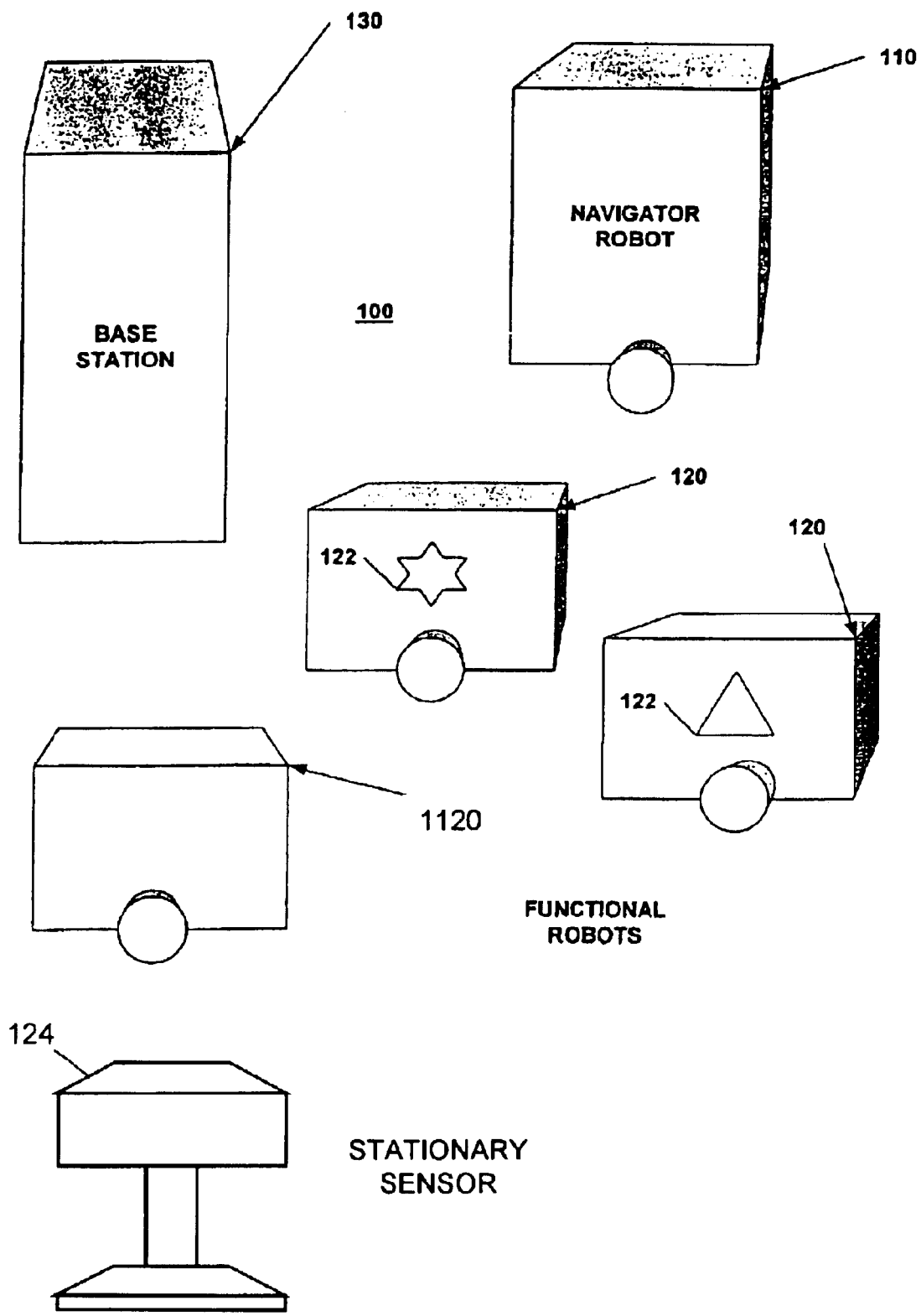
FIG. 1a is a block diagram of an autonomous multi-platform robot system in one embodiment of the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements and similar reference numerals denote similar elements.

FIG. 1a is a block diagram of an autonomous multi-platform robot system 100 in one embodiment of the invention. System 100 includes one or more mobile navigator platforms 110, one or more functional robot platforms 120, 1120, one or more stationary sensor platforms 124, and (optionally) one or more a base stations 130. The functional robot platforms 120, 1120 may include functional robot platforms with sensors 1120 and functional robot platforms without sensors 120. It is noted that base stations 130, while providing advantages that will be described below, are not required in all embodiments.

Base station 130, if included, may be equipped with charging stations to recharge the mobile robots 110, 120, 1120. Moreover, base station 130 may be configured to assist in task performance. If, for example, system 100 is implemented in a residential cleaning environment, base station 130 may be equipped with a dust bin, trash bin, water reservoir, and the like, to aid in the performance of the required tasks.

In one embodiment, a navigator platform 110 and functional robot platforms with sensors 1120 are responsible for all or substantially all mapping, localization, planning and control functions. Navigator platform 110 creates and maintains environment maps, a list of tasks to be accomplished, a task schedule and a charging schedule. Functional robot platforms 1120 are configured with all sensors and hardware required to collect and transmit environment data to navigator platform 110. Navigator platform 110 is configured with all hardware required for receiving the environment data and navigating and maneuvering itself as well as functional robot platforms 120, 1120. In this regard, navigator platform 110 has a transmitter for communicating commands to functional robot platforms 120.

Figure 1B:
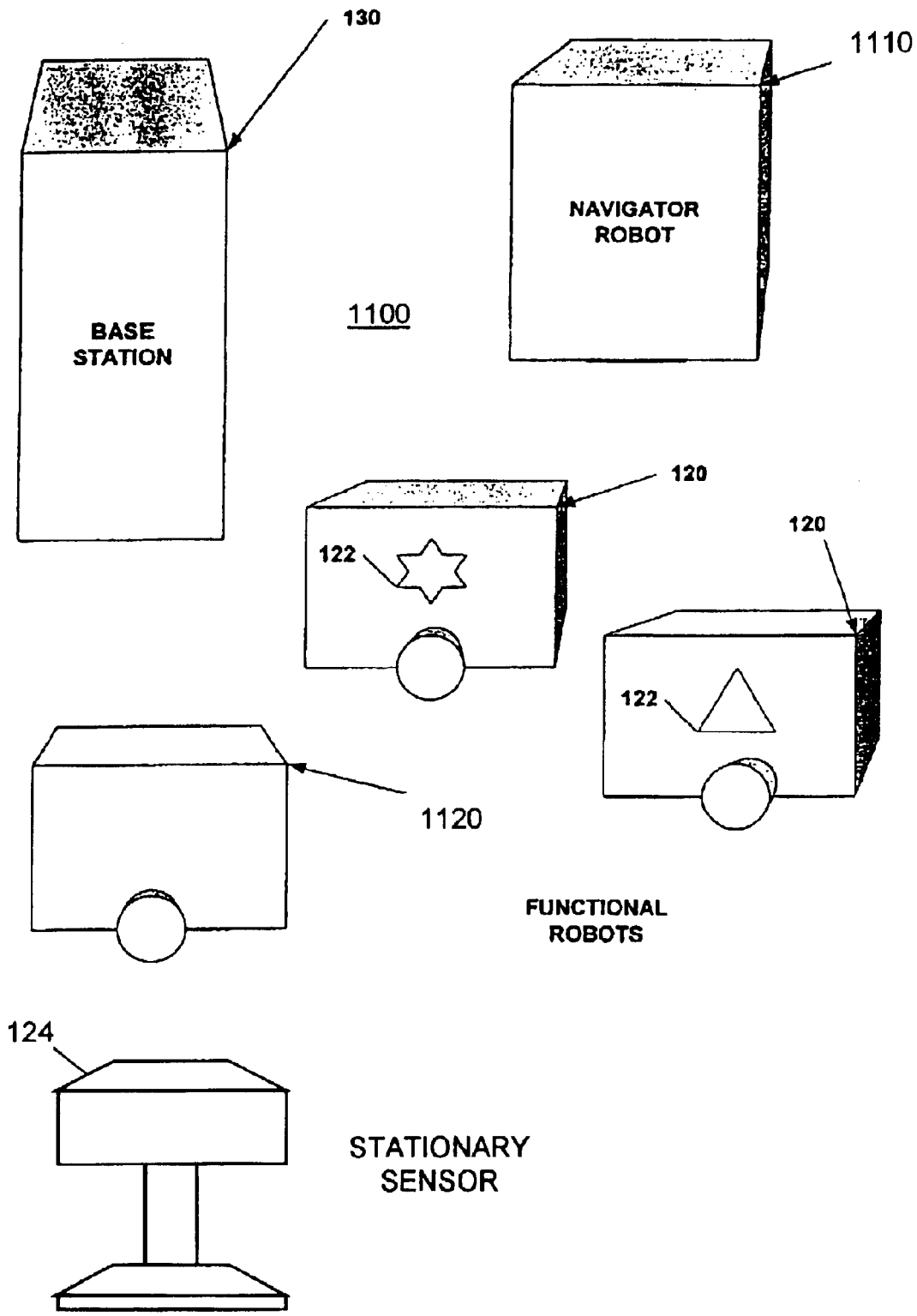
FIG. 1b is a block diagram of an autonomous multi-platform robot system in another embodiment of the invention.

Functional robot platforms 120, 1120 carry out specific tasks and may be shaped and sized to facilitate performance of those tasks. Robots 120, 1120 are equipped with receivers for receiving commands from navigator platform 110. As shown in FIGS. 1a and 1b, unique shapes or markings 122 may be applied to functional robot platforms without sensors 120 to assist navigator platform 110 in recognizing, locating and tracking them.

In another embodiment, a navigator platform 110 and stationary sensor platforms 124 are responsible for all or substantially all mapping, localization, planning and control functions. The stationary sensor platforms 124 are without wheels, rendering them immobile, yet portable allowing them to be easily hand carried by users. Stationary sensor platforms 124 are configured with all sensors and hardware required to collect and transmit environment data to navigator platform 110. Stationary sensor platforms 124 may collect environment data in addition to or instead of functional robot platforms with sensors 1120. In other words, the system 100 may be configured with either stationary sensor platforms 124 or functional robot platforms with sensors 1120 or both 124, 1120.

Figure 2A:
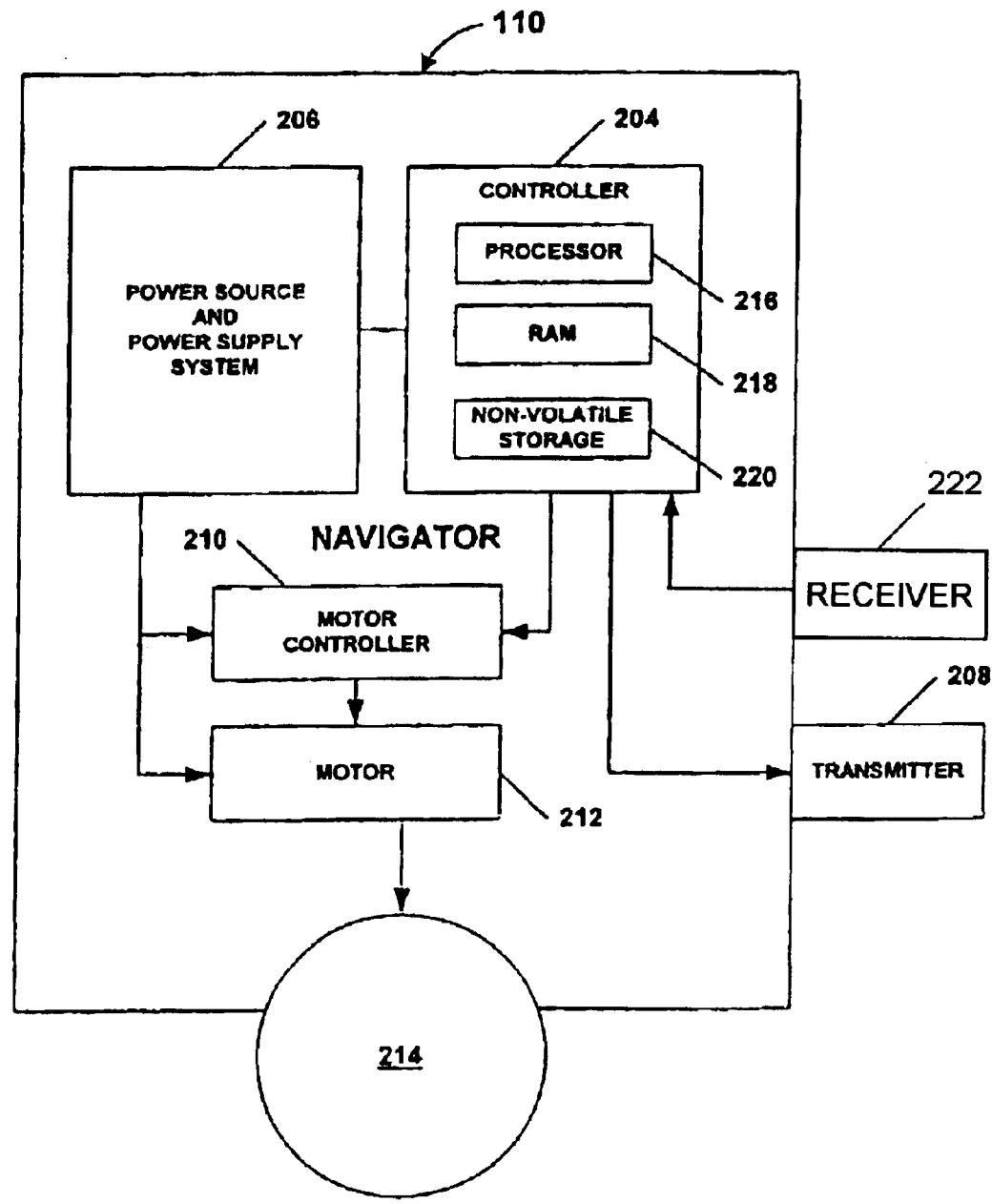
FIG. 2a is a block diagram of an embodiment of a navigator platform of the robot system.

FIG. 1b is a block diagram of an autonomous multi-platform robot system 1100 in accordance with another embodiment of the invention. System 1000 includes one or more stationary navigator platforms 1110 instead of mobile navigator platforms 110 and is similar to system 100 of FIG. 1a in many other aspects. The stationary navigator platforms 1110 are without wheels, rendering them immobile, yet portable allowing them to be easily hand carried by users. However, in one embodiment of system 1100, a navigator platform 1110 is responsible for all or substantially all mapping, localization, planning and control functions. In this embodiment, navigator platform 1110 is configured with all sensors and hardware required for navigating and maneuvering functional robot platforms 120, 1120. Navigator platform 1110 may collect environment data in addition to or instead of functional robot platforms with sensors 1120 and/or stationary sensors. In other words, the system 100 may be configured with either stationary navigator platforms 1110, stationary sensor platforms 124 or functional robot platforms with sensors 1120 or any combination thereof FIG. 2a is a block diagram of an embodiment of a mobile navigator platform 110 of the system 100. The particular implementation of robot 110 shown in FIG. 2a is provided for illustrative purposes only and should not be interpreted as requiring a specific physical architecture for navigator platform 110.

Navigator platform 110 includes controller 204, power source and power supply system 206, transmitter 208, motor controller 210, motor 212, wheels 214, and receiver 222. Controller 204 comprises a processor or central processing unit (CPU) 216, a temporary storage or RAM 218, and a nonvolatile storage 220. Information such as maps and task schedules are stored in nonvolatile storage 220 which, in one implementation, is an EPROM or EEPROM. Controller 204 receives and processes information from sensors on-board functional robot platforms 1120 and/or stationary sensor platforms 124 via receiver 222. The information received is data regarding the environment surrounding the robot 110. This may include information such as the location of navigator platform 110, the location of the functional robot platforms 120, nearby landmarks and so on. Controller 204 uses this information to determine what tasks or movements are to occur next.

Controller 204, based on the available information, controls the locomotion and maneuvering of navigator platform 110. The method and means by which navigator platform 110 maneuvers itself and effects locomotion is termed the "control loop," and includes motor controller 210, motor 212 and wheels 214. Controller 204, based on received environment data, sends appropriate commands to motor controller 210. Motor controller 210 directs motor 212 according to these commands. Motor 212, in turn, drives wheel 214. In some implementations, depending on the method and complexity of locomotion, the control loop may also include servos, actuators, transmitters and the like. The control loop may also collect and transmit odometry data to controller 204.

Figure 2B:
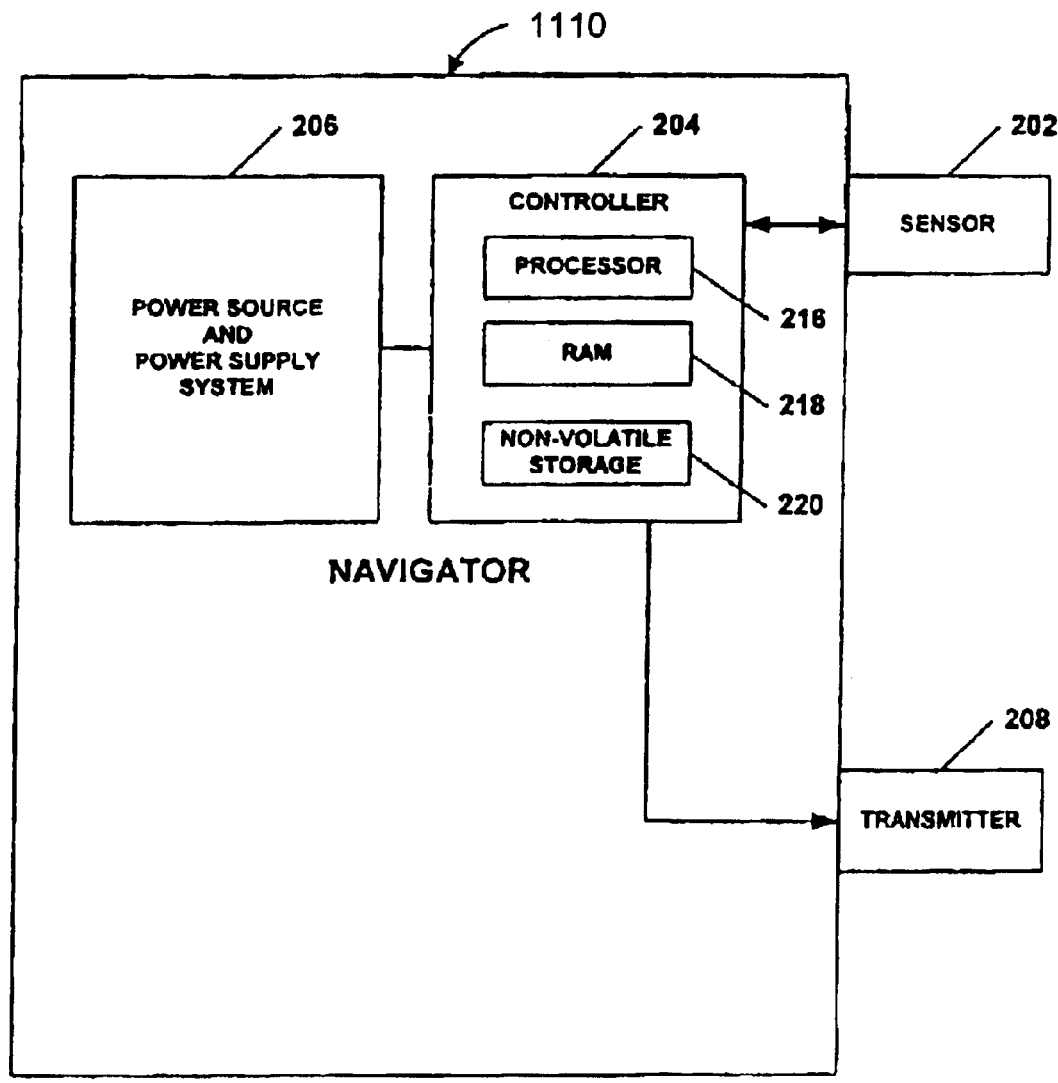
FIG. 2b is a block diagram of another embodiment of a navigator platform of the robot system.

FIG. 2b is a block diagram of an embodiment of a stationary navigator platform 1110 of system 1100. The particular implementation of robot 1110 shown in FIG. 2b is provided for illustrative purposes only and should not be interpreted as requiring a specific physical architecture for navigator platform 1110.

A sensor 202 is mounted on navigator platform 1110. Sensor 202 may be any type of sensor that is suitable for the robot's environment, and multiple sensors may be utilized. It may be mounted in a fixed position or, alternatively, may be configured such that it is able to change position and orientation relative to navigator platform 1110. Depending on the sensor type and system complexity, the position and orientation of sensor 202 may or may not be under the control of navigator platform 1110. In one example implementation, sensor 202 is a camera that records optical images of the surrounding environment. In another implementation, sensor 202 comprises a set of cameras to provide stereo vision for obtaining more detailed and accurate information about the robot's environment. Other sensor options include, but are not limited to, radar, lidar, sonar and/or combinations thereof The operation and configuration of such sensors will be familiar to those of ordinary skill in the art.

Navigator platform 1110 further comprises controller 204, power source and power supply system 206, and transmitter 208. Controller 204 is similar to the controller described above for the mobile navigator platform 110. Controller 204 receives and processes information from sensor 202 regarding the robot's surrounding environment. This may include information such as the location of navigator platform 1110, the location of the functional robot platforms 120, 1120, nearby landmarks and so on.

Figure 2C:
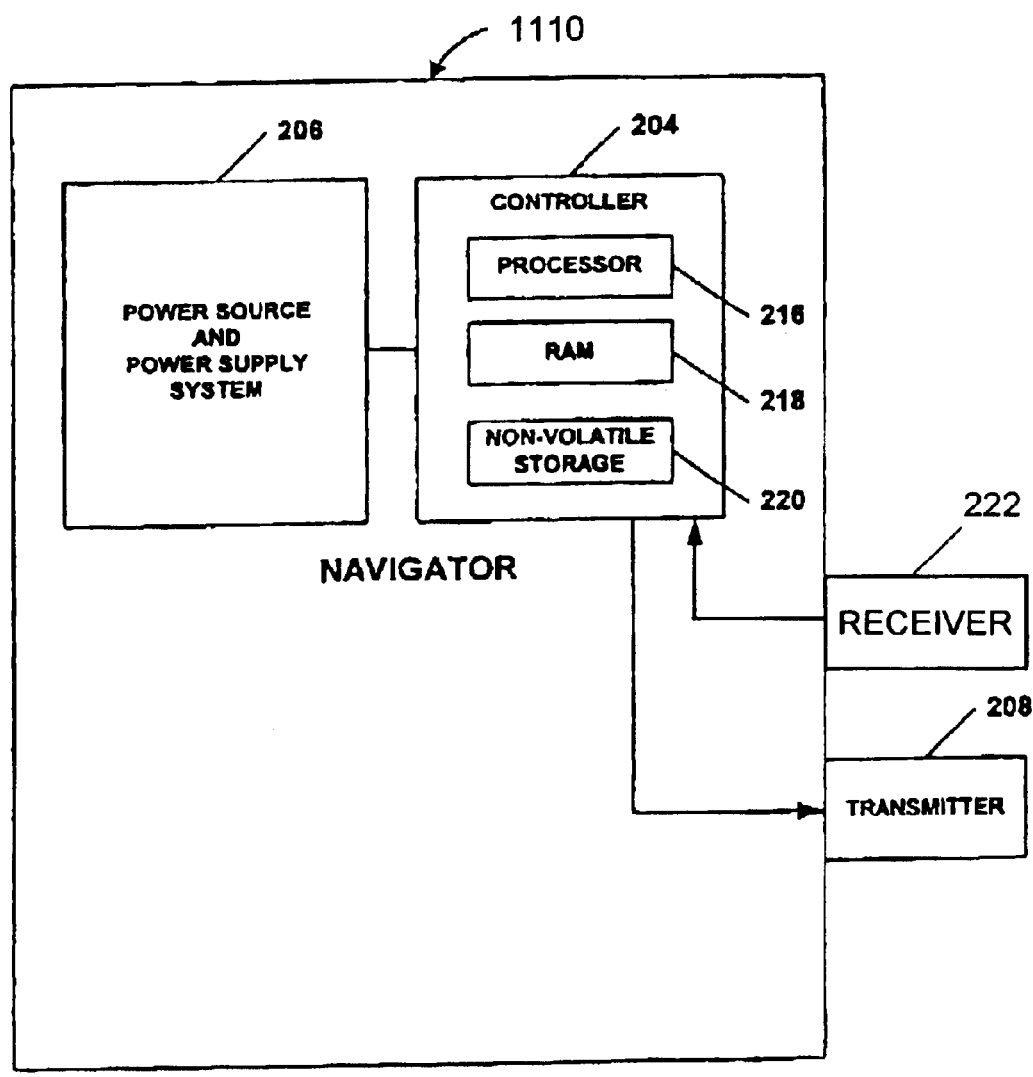
FIG. 2c is a block diagram of yet another embodiment of a navigator platform of the robot system.

FIG. 2c is a block diagram of another embodiment of a stationary navigator platform 1110 of system 1100. The particular implementation of robot 1110 shown in FIG. 2c is provided for illustrative purposes only and should not be interpreted as requiring a specific physical architecture for navigator platform 1110.

In this embodiment, navigator platform 1110 includes controller 204, power source and power supply system 206, transmitter 208, and receiver 222. Controller 204 is similar to the controller described above for the mobile navigator platform 110. Since navigator platform 1110 is stationary it does not include wheels and a control loop for locomotion.

Figure 3A:
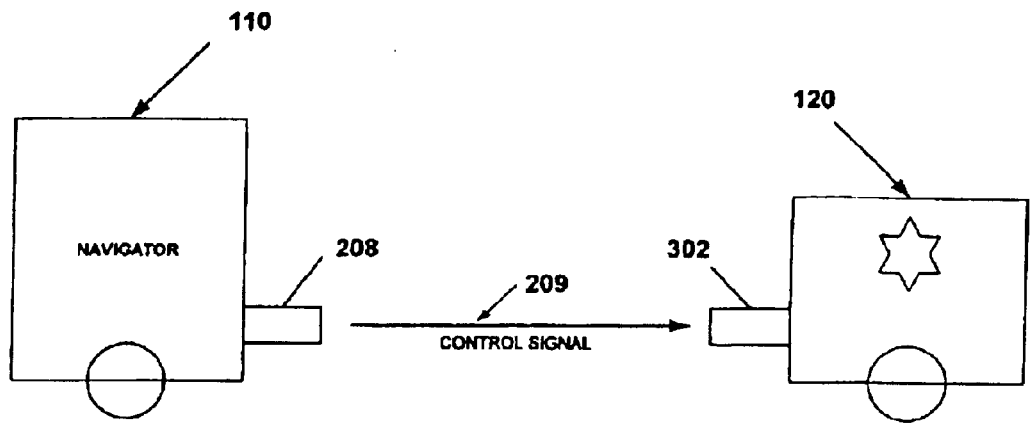
FIGS. 3a–c is a set of block diagrams depicting communications between an embodiment of a navigator platform and an embodiment of a functional robot platform, another embodiment of a functional robot platform, and an embodiment of a stationary sensor platform.

FIG. 3a depicts one aspect of system 100 in operation. Navigator platform 110 controls the movement and operation of one or more functional robot platforms 120 via transmitter 208 and a control signal 209 that is received by a receiver 302 of the functional robot platform 120.

Figure 3B:
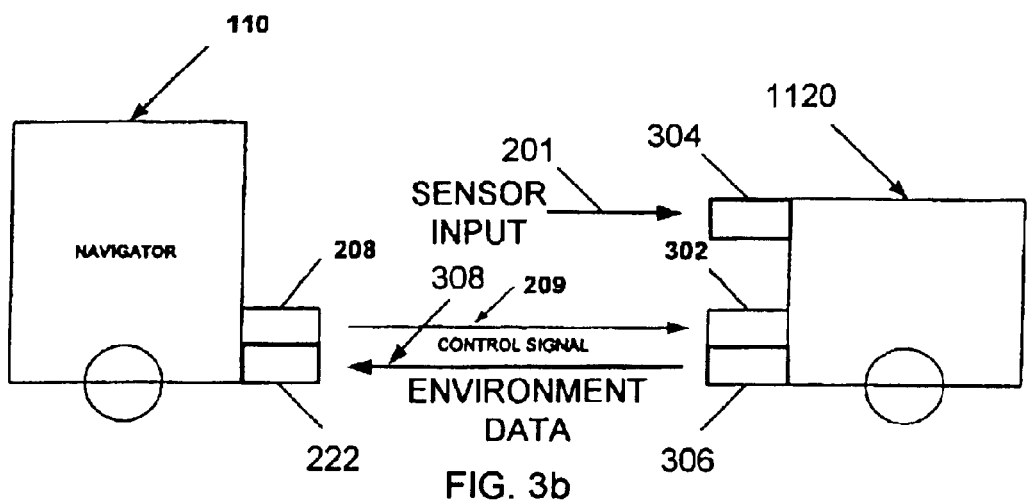

FIG. 3b depicts another aspect of system 100 operation—one or more functional robot platforms 1120 receive sensor input data 201 via sensors 304 and transmit environment data 308 to navigator platform 110 via transmitters 306. Navigator platform 110 receives the environment data 308 via its receiver 222 and determines what task, movement, or other functions functional robot platforms 120, 1120 are to undertake next. Once determined, similar to FIG. 3a, navigator platform 110 controls the movement and operation of functional robot platforms 1120 via transmitter 208.

Figure 3C:
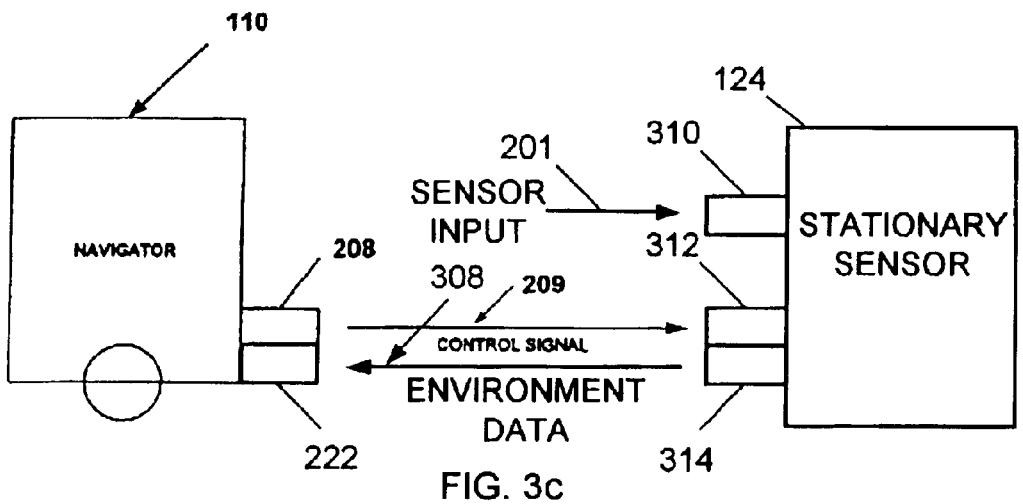

FIG. 3c depicts yet another aspect of system 100 operation—stationary sensor platforms 124 receive sensor input data 201 via sensors 310 and transmit environment data 308 to navigator platform 110 via transmitters 314. Navigator platform 110 receives the environment data 308 via its receiver 222 and determines what task, movement, or other functions functional robot platforms 120, 1120 are to undertake next. Once determined, navigator platform 110 controls the movement and operation of functional robot platforms 120, 1120 as described for FIGS. 3a and 3b. Navigator platform 110 may also control stationary sensor platforms 124 via transmitter 208.

Figure 3D:
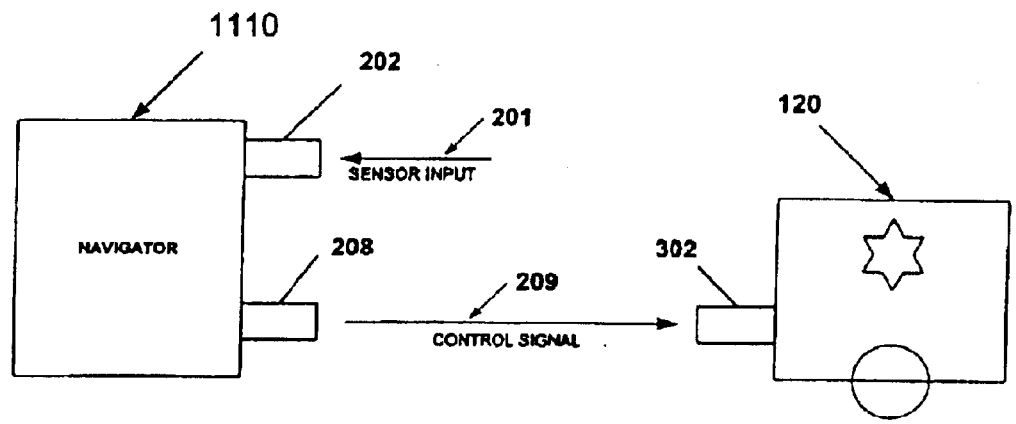
FIGS. 3d–f is a set of block diagrams depicting communications between another embodiment of a navigator platform and an embodiment of a functional robot platform, another embodiment of a functional robot platform, and an embodiment of a stationary sensor platform.

FIG. 3d depicts still yet another aspect of system 1100 operation—navigator platform 1110 receives sensor input data 201 (i.e., environment data) via sensors 310 and determines what task, movement, or other functions functional robot platforms 120, 1120, if any, are to undertake next. Once determined, similar to FIG. 3a, navigator platform 1110 controls the movement and operation of functional robot platforms 120 via transmitter 208.

Figure 3E:
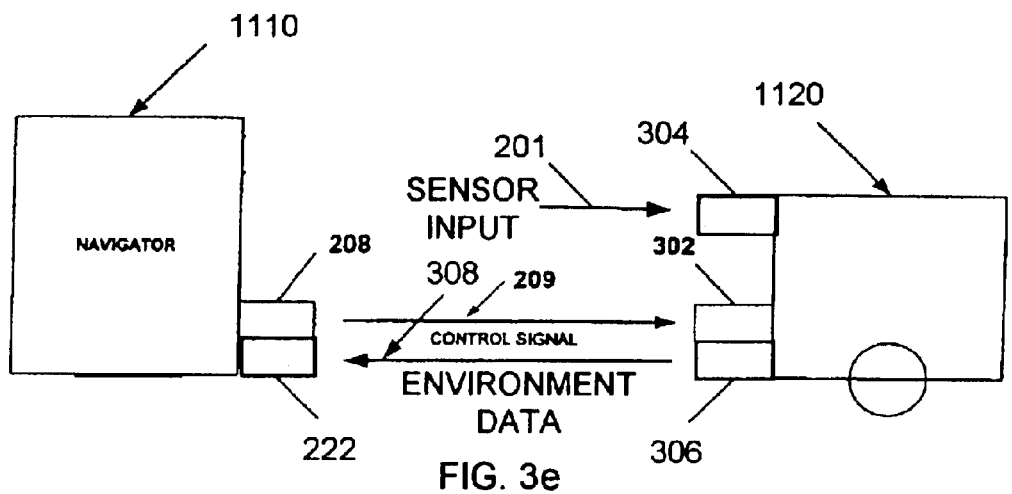

FIG. 3e depicts another aspect of system 1100 operation—similar to FIG. 3b, functional robot platforms 1120 receive sensor input data 201 via sensors 304 and transmit environment data 308 to navigator platform 1110 via transmitters 306. Navigator platform 1110 receives the environment data 308 via its receiver 222 and determines what task, movement, or other functions functional robot platforms 120, 1120 are to undertake next. Once determined, similar to FIG. 3d, navigator platform 1110 controls the movement and operation of functional robot platforms 1120 via transmitter 208.

Figure 3F:
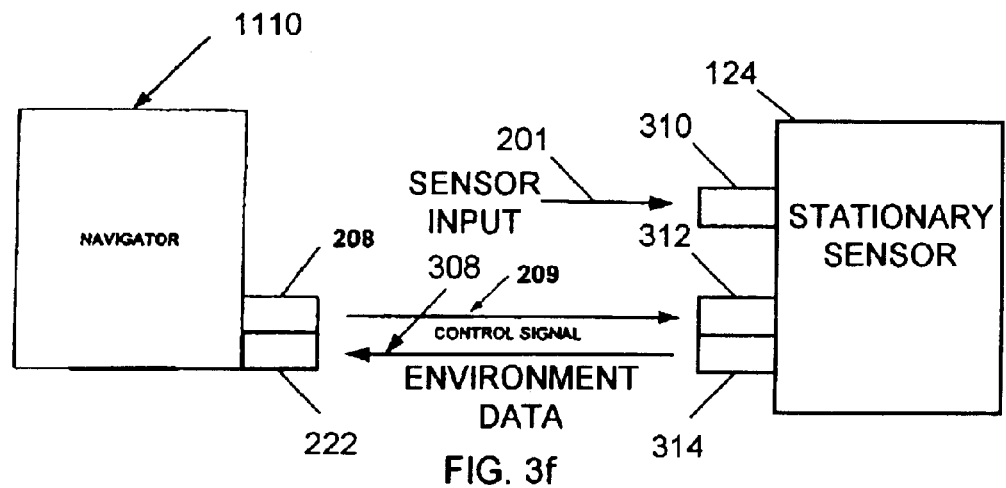

FIG. 3f depicts yet another aspect of system 100 operation—similar to FIG. 3c, stationary sensor platforms 124 receive sensor input data 201 via sensors 310 and transmit environment data 308 to navigator platform 110 via transmitters 314. Navigator platform 1110 receives the environment data 308 via its receiver 222 and determines what task, movement, or other functions functional robot platforms 120, 1120 are to undertake next. Once determined, navigator platform 1110 controls the movement and operation of functional robot platforms 120, 1120 as described for FIGS. 3d and 3e. Navigator platform 1110 may also control stationary sensor platforms 124 via transmitter 208.

Transmitter 208 and receivers 302, 312 may use any suitable conventional communication means and medium. Likewise, transmitters 306, 314 and receiver 222 may use any suitable conventional communication means and medium. In one implementation, acoustic waves are used for communication between navigator platform 110, 1110 and functional robot platforms 120, 1120 and between navigator platform 110, 1110 and stationary sensor platforms 124. In one implementation example, an acoustic wave at one frequency would denote a command to move in one direction (e.g., from navigator platform 110, 1110 to functional robot platform 120, 1120), while an acoustic wave at another frequency would denote a command to move in another direction (e.g., from functional robot platform 120 to navigator platform 110). Other suitable communication means include, but are not limited to, wired or wireless communication, infrared signals and magnetic induction.

Figure 4A:
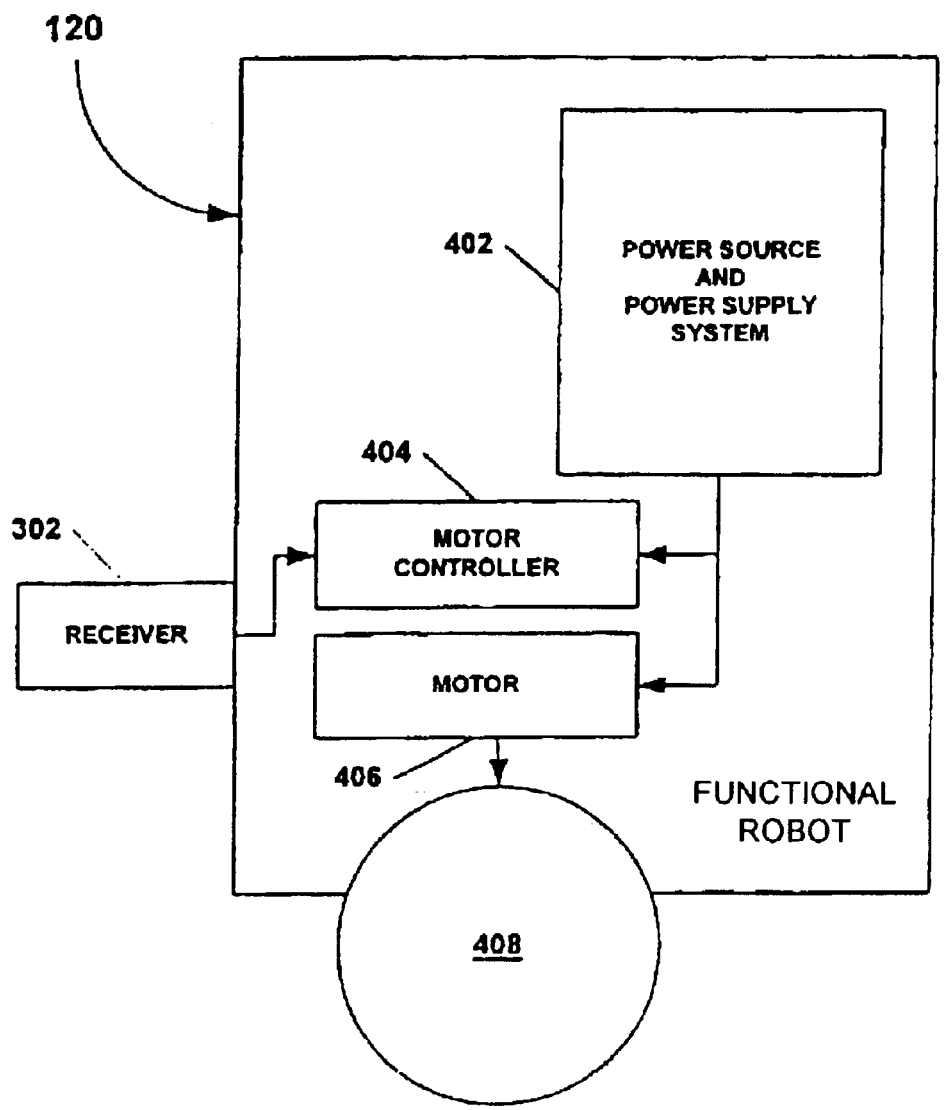
FIG. 4a is a block diagram of an embodiment of a functional robot platform of the robot system.

The particular implementation of robot 120 shown in FIG. 4a is provided for illustrative purposes only and should not be interpreted as requiring a specific physical architecture for robot 120.

As described above, functional robot platform 120 includes a receiver 302. The control loop for moving and maneuvering robot 120 comprises a power source and power supply system 402, motor controller 404, motor 406 and wheels 408. Control signals received from navigator platform 110, or 1110, via receiver 302 direct motor controller 404. Controller 404 controls motor 406, which in turn drives wheels 408. The control loop may also comprise servos, actuators, transmitters and the like.

Figure 4B:
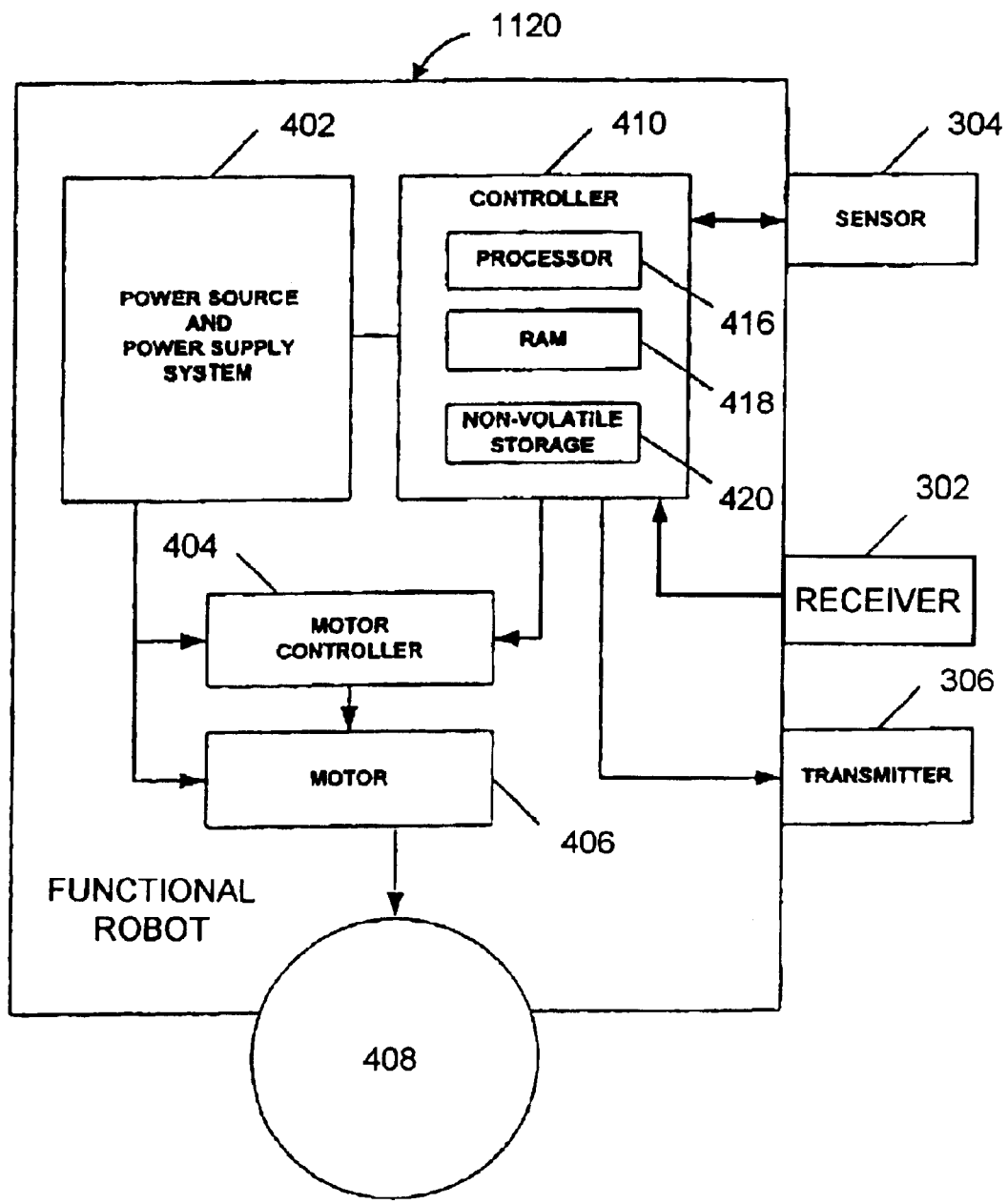
FIG. 4b is a block diagram of another embodiment of a functional robot platform of the robot system.

The particular implementation of robot 1120 shown in FIG. 4b is provided for illustrative purposes only and should not be interpreted as requiring a specific physical architecture for robot 1120.

A sensor 304 is mounted on robot 1120. Sensor 304 is similar to sensor 202 in navigator platform 1110. The description above of sensor 202 applies to sensor 304 in regard to its operation in robot 1120. Depending on the sensor type and system complexity, the position and orientation of sensor 304 may or may not be under the control of navigator platform 110, 1110.

Robot 1120 further comprises controller 410, power source and power supply system 402, transmitter 302, receiver 306, motor controller 404, motor 406, and wheels 408. Controller 410 is similar to the controller 204 described above for the mobile navigator platform 110. Controller 410 receives and processes information from sensor 304 regarding the robot's surrounding environment. This may include information such as the location of navigator platform 110, 1110, the location of the other functional robot platforms 120, 1120, nearby landmarks and so on. The controller 410 transmits the sensor data to navigator platform 110, 1110 via transmitter 306.

Like functional robot platform 120, functional robot platform 1120 includes a receiver 302. The receiver 302 receives commands for operating and maneuvering the robot 1120 from navigator platform 110, 1110 and communicates the commands to the controller 410. The control loop for moving and maneuvering robot 1120 comprises power source and power supply system 402, motor controller 404, motor 406 and wheels 408. The controller 410, based on operating and maneuvering commands, sends appropriate commands to motor controller 404. Motor controller 404 directs motor 406 according to these commands. Motor 406, in turn, drives wheel 408. As with robot 120, the control loop in robot 1120 may also comprise servos, actuators, transmitters and the like.

Figure 4C:
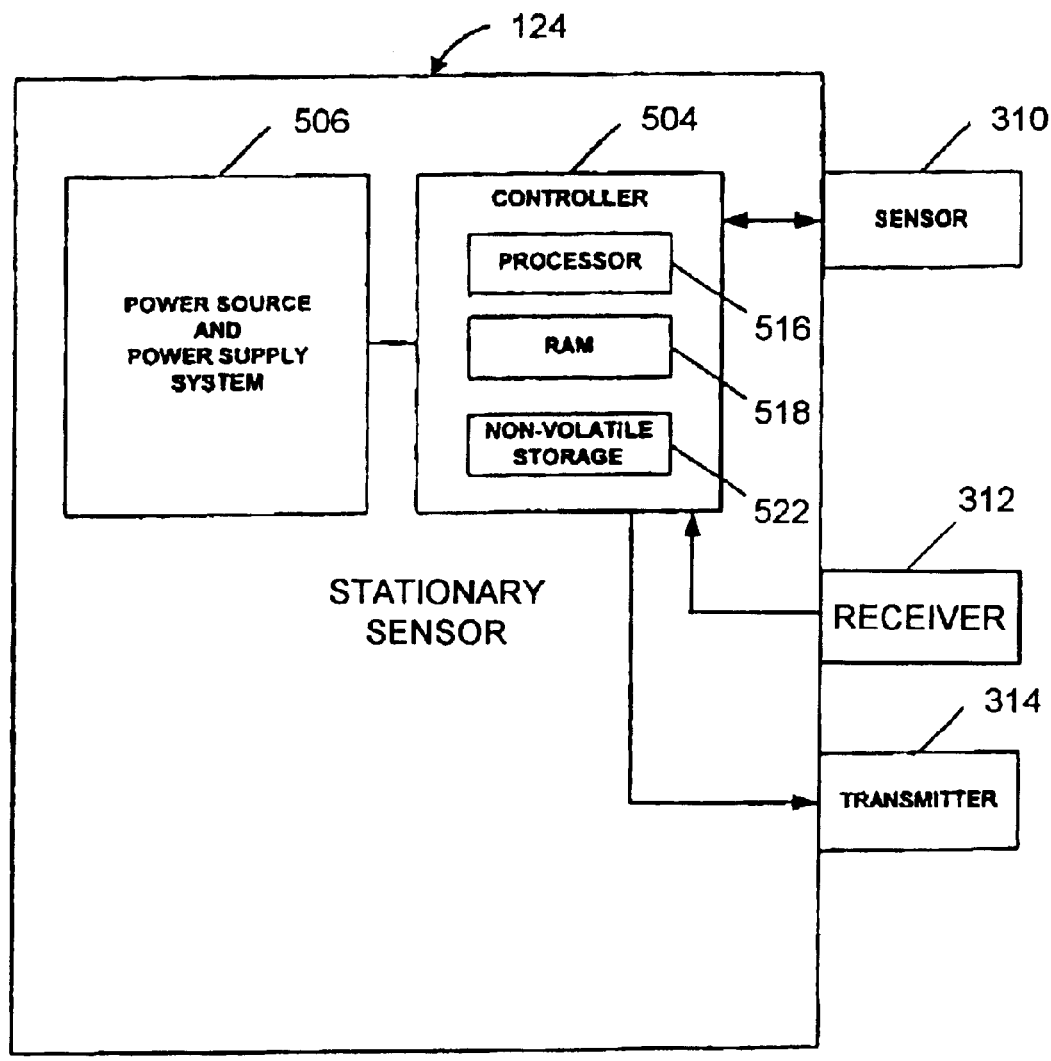
FIG. 4c is a block diagram of an embodiment of a stationary sensor platform of the robot system.

Reference is now made to a block diagram of an embodiment of a stationary sensor platform 124 of system 100, 1100, as shown in FIG. 4c. Again, the particular implementation of stationary sensor platform 124 shown in FIG. 4c is provided for illustrative purposes only and should not be interpreted as requiring a specific physical architecture for stationary sensor platform 124.

A sensor 310 is mounted on stationary sensor platform 124. Sensor 310 is similar to sensor 202 in navigator platform 1110 and sensor 304 in functional robot platform 1120. The descriptions above of sensors 202 and 304 applies to sensor 310 in regard to its operation in stationary sensor platform 124. Depending on the sensor type and system complexity, the position and orientation of sensor 310 may or may not be under the control of navigator platform 110, 1110. Stationary sensor platform 124 may be portably positioned upright on horizontal surfaces, installed on vertical surfaces, extending downward from a horizontal surface (e.g., a ceiling), or located at various positions within an environment to enable suitable communications with navigator platform 110, 1110.

Stationary sensor platform 124 further comprises controller 504, power source and power supply system 506, transmitter 314, and receiver 312. Similar to controller 410 for robot 1120, controller 504 receives and processes information from sensor 310 regarding the robot's surrounding environment. This may include information such as the location of navigator platform 110, 1110, the location of the other functional robot platforms 120, 1120, nearby landmarks and so on. The controller 504 transmits the sensor data to navigator platform 110, 1110 via transmitter 314.

Like functional robot platform 1120, stationary sensor platform 124 includes a receiver 312. The receiver 312 receives commands for operating the stationary sensor platform 124 from navigator platform 110, 1110 and communicates the commands to the controller 504.

The power source and supply modules of navigator platforms 110, 1110, functional robot platforms 120, 1120, and stationary sensor platforms 124 may be similar or identical. The power source portion may comprise any suitable power source including, but not limited to, batteries, electrical outlets, fuel cells, internal combustion or other engines, or combinations thereof. The power supply portion conditions the, usually electric, power and distributes it to meet any applicable specifications or requirements. Likewise, other similarly functioning components (e.g., controllers, sensors, receivers, transmitters) in navigator platforms 110, 1110, functional robot platforms 120, 1120, and stationary sensor platform 124 may be similar or identical.

As noted above, the invention provides a system and method for allocating mapping, localization, planning, control and task performance in an autonomous multi-platform robot environment. In particular, in one embodiment, mapping, localization, preplanning, and planning and control functions are assigned to a mobile navigator platform and a mobile functional robot platform with sensors, and task performance functions are assigned to at least one mobile functional robot platform. In another embodiment, mapping, localization, preplanning, and planning and control functions are assigned to a mobile navigator platform and a stationary sensor platform, and task performance functions are assigned to at least one mobile functional robot platform. In yet another embodiment, mapping, localization, preplanning, and planning and control functions are assigned to a stationary navigator platform with sensors, and task performance functions are assigned to at least one mobile functional robot platform. In still another embodiment, mapping, localization, preplanning, and planning and control functions are assigned to a stationary navigator platform and a mobile functional robot platform with sensors, and task performance functions are assigned to at least one mobile functional robot platform. In still yet another embodiment, mapping, localization, preplanning, and planning and control functions are assigned to a stationary navigator platform and a stationary sensor platform, and task performance functions are assigned to at least one mobile functional robot platform. Each function (mapping, localization, preplanning, planning and control and task performance) is discussed below.

In one embodiment, navigator platform 1110 performs all or substantially all mapping functions. In other embodiments, navigator platform 110, 1110 performs mapping functions in conjunction with a functional robot platform 1120, a stationary sensor platform 124, or both 1120, 124. Mapping is the process by which a representation of the environment is created and updated from sensor data and preprogrammed input. Several maps having different levels of resolution, stability and/or coordinate systems may be maintained. Dynamic mapping maintains the current dynamic map (CDM), which is a probabilistic two-dimensional (2D) or three-dimensional (3D) map of the robot's environment. A static map of the environment's outer perimeter (i.e. room walls or yard boundaries) may also be created. The maps created by navigator platform 110, 1110 are stored in RAM 218 or non-volatile memory 220.

The iterative mapping process essentially comprises the steps of collecting sensor data of the objects and obstacles in the immediately surrounding area of a stationary navigator platform with sensors 1110, a functional robot platform with sensors 1120, or a stationary sensor platform 124, performing localization, and updating the dynamic map to incorporate information derived from the new sensor data. The functional robot platform with sensors 1120 can be iteratively moved to collect information for a given environment. Alternatively, multiple stationary components (i.e., navigator platforms 1110, stationary sensor platforms 124) can be strategically positioned and sequenced by a master navigator platform 110, 1110 to collect the environment data. Either process is computationally intensive and time consuming. As will be explained, however, consolidation of the environment data for mapping functions in navigator platform 110, 1110 reduces the time required for mapping to a fraction of the time that conventional systems require for mapping.

As noted above, in addition to a dynamic map of the environment, a static map of the environment's outer perimeter may be created. The static map may include, for example, the walls of a building or the boundaries of a yard. It may be predetermined and input to navigator platform 110, 1110 or, alternatively, navigator platform 110, 1110 may make a static map of the environment before task performance is initiated. In the latter case, in one embodiment, navigator platform 110, 1110 works in conjunction with a functional robot platform with sensors 1120 to follow a physically distinct perimeter, maintaining a dynamic map as the robot 1120 moves and incorporating perimeter information from the dynamic map into the static map. The process continues until the static map is complete, consistent and stable. In another embodiment, the navigator platform 110, 1110 works in conjunction with other navigator platforms 1110 and/or stationary sensor platforms 124 to sequence along a distinct perimeter area defined by pre-positioning of the stationary devices (i.e., navigator platforms 1110, stationary sensor platforms 124)

The process of creating the static map is relatively long and iterative. Preferably, it is done just once upon introduction of the system to a new environment. The exact methodology used to create the map will depend on the sensors used and algorithms chosen to perform the calculations. Once created, in one implementation, the static map is permanently stored in navigator platform 110, 1110. The navigator can locate its position in the static map by recognizing landmarks and other physical attributes of the environment and by aligning the CDM within the static map. Alternatively, navigator platform 110, 1110 can locate its position in the static map in conjunction with a functional robot platform with sensors 1120 and/or a stationary sensor platform 124. No origin or reference point is required. The use of certain assumptions may shorten the time and computation required to create the static map. In an office or home environment, for example, it can he assumed that walls are square and flat. Use of such assumptions decreases the time required for creating the static map.

In one implementation, the mapping process includes three maps created from sensor data derived from a pair of stereo digital cameras mounted on navigator platform 1110. Alternatively, the three maps may be created from sensor data derived from a pair of stereo digital cameras mounted on one or more functional robot platforms 1120 and/or one or more stationary sensor platforms 124. The first map in this implementation is a temporary map (TM) of navigator's 110, 1110 immediate surroundings. In particular, the TM is a probabilistic representation created from the last stereo pair of images of the immediately surrounding environment. The second map in this implementation is the CDM. The CDM is a probabilistic 3D representation of the working environment and is created by alternatively incorporating information from successive TMs. The CDM in this implementation is updated every time the navigator platform 110, 1110 moves. The third map in this implementation is the static perimeter map (PM). As described above, the PM is created as navigator platform 110, 1110 follows the outer perimeter of the environment.

In another implementation, the map(s) are not created by navigator platform 110, 1110, but rather, are input to or preprogrammed in navigator platform 110, 1110. In a further implementation, a static map is not created or input before task initiation. In this implementation, navigator platform 110, 1110 simply starts with a blank dynamic map and updates it as tasks are performed.

In one embodiment, navigator platform 110 is responsible for navigating both itself and functional robot platforms 120 around the mapped environment. In this embodiment, navigator platform 110 is responsible for all or substantially all aspects of navigation, including localization, planning and control for both itself and functional robot platforms 120. In conventional systems, by contrast, each mobile robot is responsible for its own localization, planning and control. Each robot in such systems is responsible for navigating and maneuvering itself into the proper position to perform a task. Such systems are subject to localization calculation delays for all the robots, which makes task completion slow and inefficient. The embodiment being described avoids such delays and increases efficiency by gathering all or substantially all navigation functions in one navigator platform 110 and minimizing the amount of movement for that robot.

In another embodiment, navigator platform 1110 is stationary and is responsible for navigating functional robot platforms 120, 1120 around the mapped environment. Similar to the previously described embodiment, in this embodiment, navigator platform 1110 is responsible for all or substantially all aspects of navigation, including localization, planning and control for functional robot platforms 120, 1120.

Localization is the process by which the robot's current position, orientation and rate of change within the map is determined. Different procedures may be used for localizing the navigator and for localizing the functional robot platforms. Localization of the functional robot platforms is relatively simple, since the navigator, in one embodiment, is stationary or substantially stationary when localizing the functional robot platforms and thus knows its location within the CDM. In one implementation, the navigator platform 110 simply tracks the functional robot platform using the vision systems (i.e., sensors 304, 310) of the functional robot platform 1120 or stationary sensor platform 124 and then filters the vision data with a tracking filter, such as a Kalman filter. If the functional robot platform 120 has moved or rotated a short distance, the sensors 304, 310 can detect this movement and locate the functional robot platform 120. In implementations that use a base station 130, the location of functional robot platforms 120 near the base station 130 can also be quickly ascertained.

The unique shapes and/or geometric markings 122 on functional robot platforms 120 may also assist navigator platform 110 in locating robots 120. The type of sensor 202 that is used by navigator platform 110 will dictate whether a unique shape or marking is used and how it is recognized. In one implementation, navigator platform 110 uses a neural net to process sensor data and to recognize specific shapes. In another implementation, the navigator uses its vision or sensor system to recognize any markings and/or shapes.

In addition to localizing the functional robot platforms 120, 1120, navigator platform 110, 1110, in one embodiment, localizes itself after any movement. Localization of the navigator is inextricably linked with mapping, particularly with the maintenance of the CDM (i.e., in order to maintain the CDM, the navigator must know where it is within the CDM). Where both a CDM and a static PM are used, localization involves determining the locations of both the navigator and functional robot platforms within those maps. Note that the CDM may be preprogrammed.

The process of localizing the navigator is typically more involved than the process of localizing the functional robot platforms. Potential methods by which the navigator may localize itself include dead reckoning, active beacon, active sensor and landmark recognition methods. Using dead reckoning, a rough estimate of the robot's change in position may be maintained using odometry and inertial navigation systems. Active beacon localization methods determine the robot's position by measuring its distance from beacons placed at known positions in the environment. Triangulation can then be used to pinpoint the robot's location. Active sensor localization methods track the robot's position with sensors, such as digital cameras, that are placed at known, fixed locations. Landmark recognition methods may be used in which the robot recognizes and knows the position of features and landmarks within the environment. The recognized landmark positions are used to calculate the robot's position.

Because of its low cost and simplicity, some form of dead reckoning (particularly odometry) can be employed according to one embodiment of the invention. Dead reckoning localization errors may accumulate over time, however, due to factors such as wheel slippage and misalignment. To compensate for these errors, auxiliary techniques such as those discussed above may be used in combination with dead reckoning. Real world factors and constraints may limit the feasibility of auxiliary techniques. Active beacon and sensor methods typically require installation of foreign objects such as cameras or reflective tape in the robot's environment. While installation of such objects may be acceptable in factory and industrial settings, it is generally not acceptable in home, office and outdoor environments. For these reasons, use of landmark recognition to augment dead reckoning localization is provided in one embodiment of the invention.

Even when dead reckoning is used in combination with an auxiliary technique such as landmark recognition, factors such as limited sensor resolution typically make localization less than completely accurate. A number of localization algorithms, such as the Markov and Monte Carlo algorithms, may be used to further improve localization accuracy.

Figure 7A:
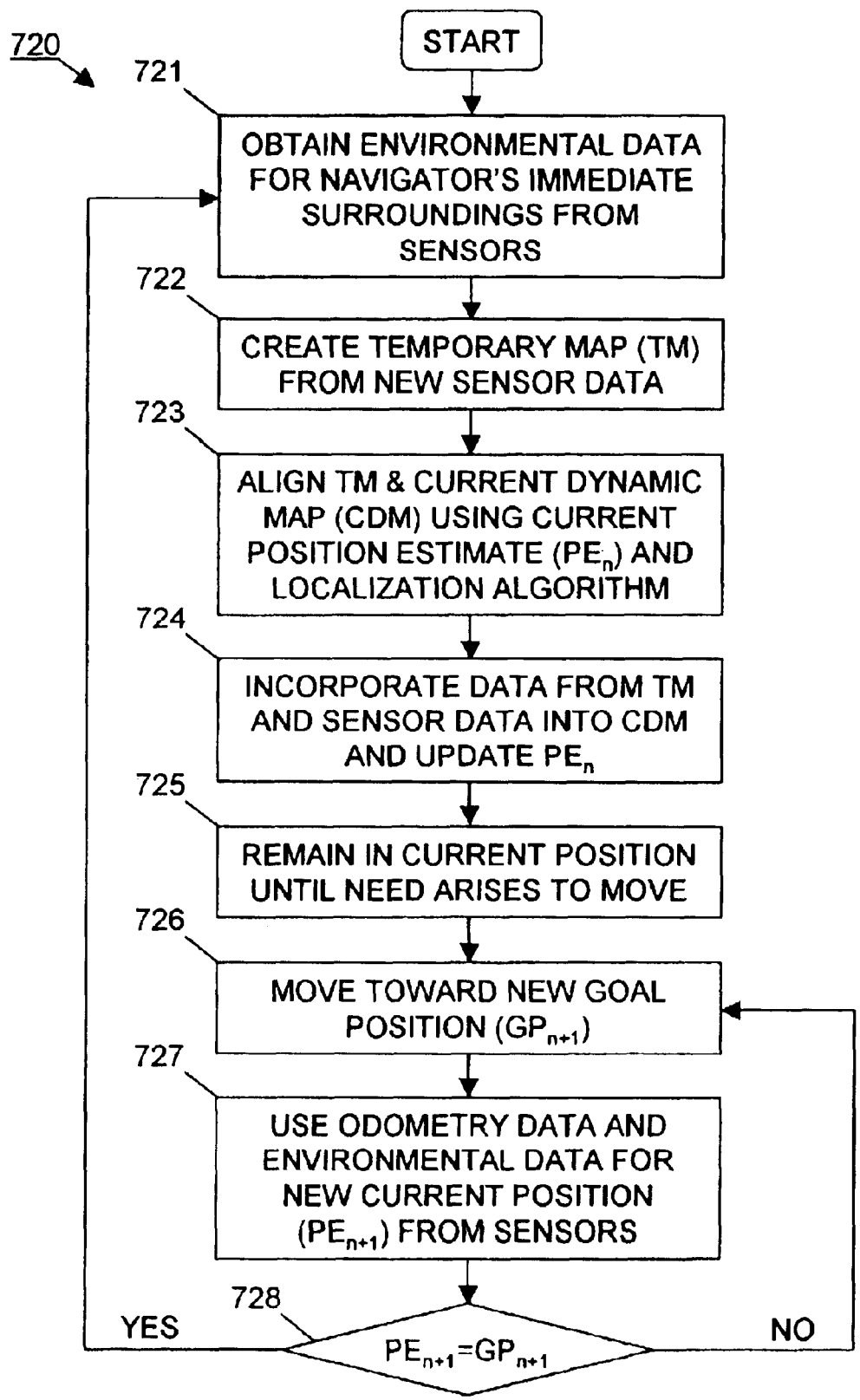
FIG. 7a is a flow diagram illustrating one method by which the navigator platform localizes itself within a dynamic map of the environment.

FIG. 7a is a flowchart illustrating the substeps that may be involved in one embodiment of the mapping and localization process 720 for navigator platform 110. At step 721, navigator platform 110 obtains sensor data for its immediate surroundings from sensors aboard a functional robot platform with sensors 1120 or a stationary sensor platform 124. In one embodiment, a pair of digital stereo cameras is used to obtain the sensor data. From the stereo image pair, a new TM is created in step 722 and aligned relative to the CDM (step 723). In order to align the temporary and current maps, a set of position estimates $PE_{n+1,1} \ldots PE_{n+1,m}$ is generated. A localization algorithm such as the Markov or Monte Carlo localization algorithms may be used to generate this set of estimates. The range of error in the position estimates will dictate how large the factor m is. The best estimate $PE_{n+1,k}$ ($1 \leq k \leq m$) from the range is selected, and using $PE_{n+1,k}$ information is extracted from the TM and sensor data and added to the CDM (step 724). The TM is then discarded.

Navigator platform 110 may remain stationary (step 725) to minimize computation. In one embodiment, the navigator platform 110 tracks and controls the functional robot platforms while remaining stationary as described below. Eventually navigator platform 110 may need to move. As navigator platform 110 begins to move toward a new goal position $GP_{n+1}$ (step 726), it may collect odometry data (using, in one implementation, dead reckoning methods as described above) for use in obtaining an estimate of its distance and orientation from $PE_n$, (step 727). In another embodiment, navigator platform 110 also tracks the position of one or more functional robot platforms or other recognized landmarks (through a tracking filter) using sensors aboard a functional robot platform with sensors 1120 or a stationary sensor platform 124 in order to provide an improved estimate of its current position. When, through use of dead reckoning and landmark recognition as described above, navigator platform 110 determines that its latest position estimate $PE_{n+1}$ is within an acceptable threshold relative to the new goal position $GP_{n+1}$ (decision node 728), it stops and returns to step 721 to repeat the localization and mapping process.

Figure 9:
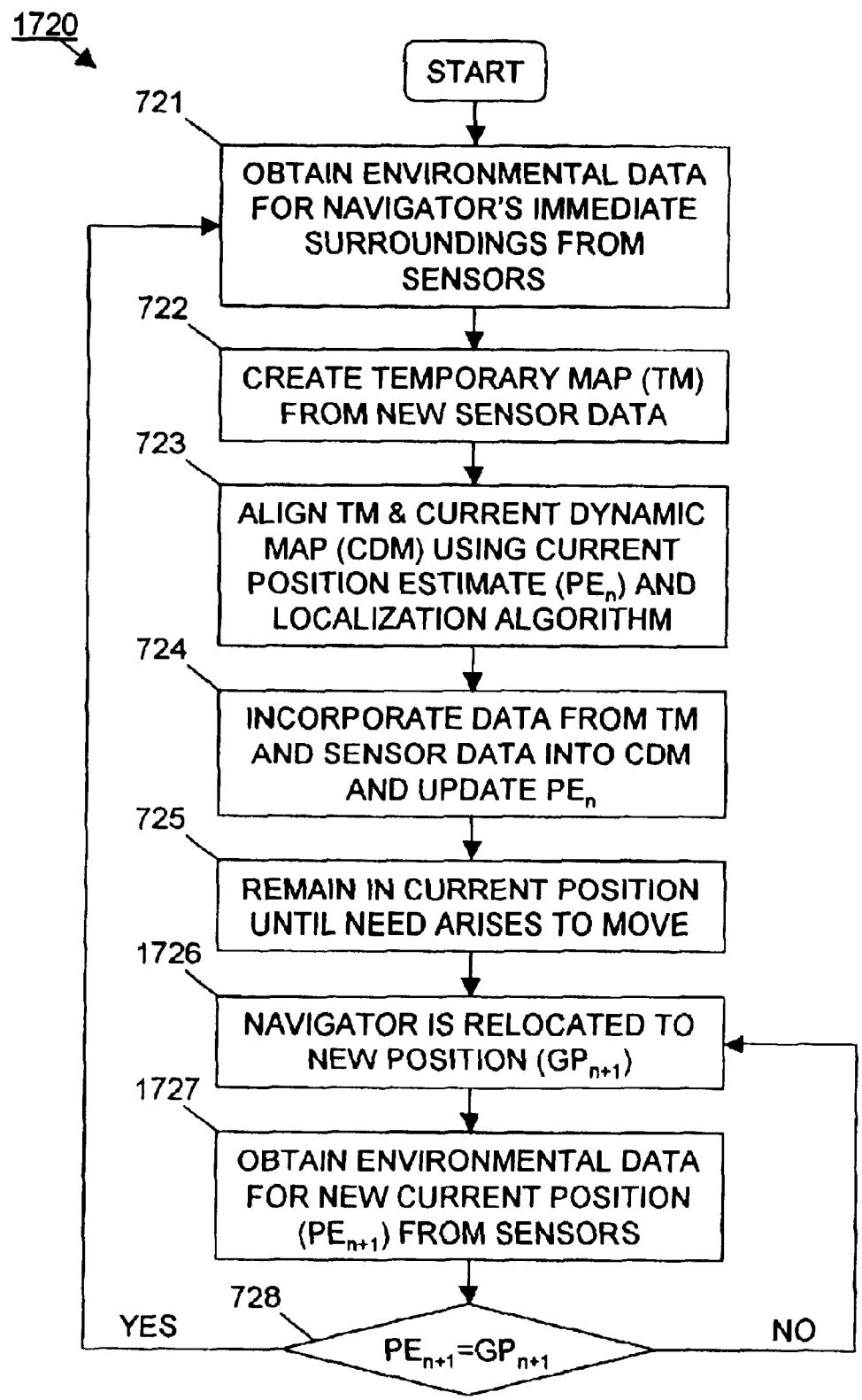
FIG. 9 is a flow diagram illustrating another method by which the navigator platform localizes itself within a dynamic map of the environment.

FIG. 9 shows a flowchart illustrating the substeps that may be involved in another embodiment of the mapping and localization process 720 for navigator platform 1110. Generally, the steps are the same as in FIG. 7a, described above for navigator platform 110. However, since navigator platform 1110 is stationary and may include onboard sensors, several steps are slightly different. First, environmental data in steps 721 and 1727 may also be obtained from sensors on board navigator platform 1110. Otherwise, the most significant difference is in steps 1726 and 1727 where, if a need arises for navigator platform 1110 to move, navigator platform 1110 must be relocated to a new position ($GP_{n+1}$) manually. Typically, navigator platform 1110 will include one or more handles or grips 1112 (FIG. 12) to facilitate such moving.

It should also be noted that rather than moving navigator platform 1110, the system 1100 may merely advance to another pre-positioned stationary sensor platform 124 that has come in view of the working functional robot platform 120, 1120. Still another alternative is for navigator platform 1110 to control a second functional robot platform with sensors 1120 to track the working functional robot platform 120, 1120. Additional, alternatives are also contemplated, such as using multiple navigator platforms 1110 pre-positioned strategically as described for stationary sensor platform 124.

Figure 7B:
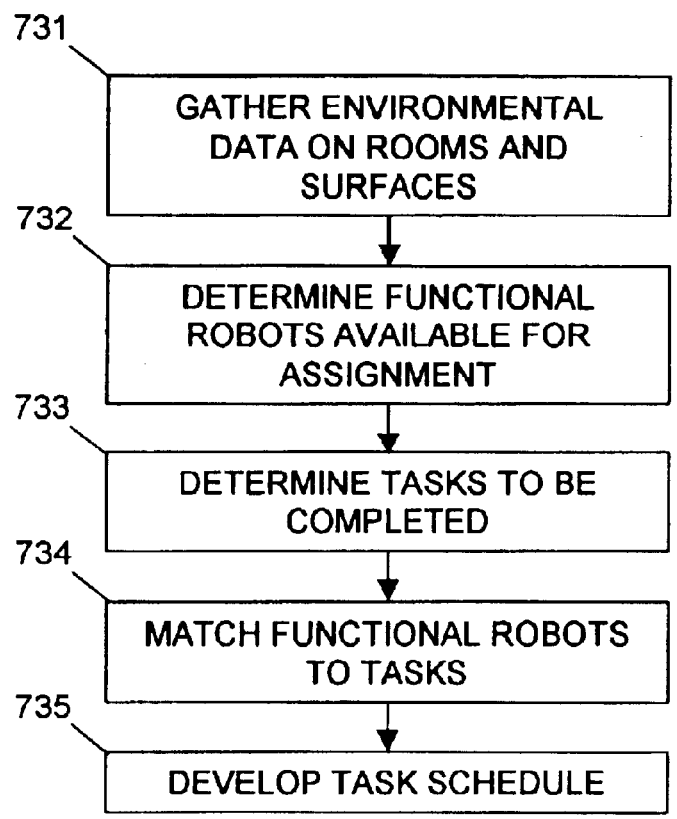
FIG. 7b is a flow diagram illustrating one method by which the navigator platform performs preplanning.

In one embodiment, navigator platform 110, 1110 may gather information about the environment and perform information gathering and preplanning. The various substeps that may be involved in this embodiment of the information gathering and preplanning processes are illustrated in more detail in FIG. 7b. It is noted that the steps illustrated in FIG. 7b may be performed in any order, and that each of the steps is optional. That is, information gathering and preplanning may be accomplished without some of the listed steps, and some of the listed steps may be preprogrammed or input to navigator platform 110, 1110.

In step 731, navigator platform 110, 1110 gathers additional data such as the characteristics of the room or environment in which one or more of the functional robot platforms are present (i.e., size, cleaning requirements, etc.) and the types of surfaces present in those rooms. In one embodiment, data is collected for each of the functional robot platforms in the system. This data may be gathered using the same sensors used for mapping and localization or, alternatively, different sensors may be used to gather the data. For example, if a sonar sensor is used for mapping and localization, a different sensor, such as a camera, is generally used for gathering data such as room surface types.

In step 732, navigator platform 110, 1110 determines what functional robot platforms 120, 1120 are available for task performance. Alternatively, this information may be input to or preprogrammed in navigator platform 110, 1110, or it may simply be unnecessary information. Next, in step 733, navigator platform 110, 1110 determines what tasks need to be performed. Again, this information may be preprogrammed in navigator platform 110, 1110, input via an interface, or determined via a combination of preprogramming and input.

Using the information gathered in steps 731-733, navigator platform 110, 1110 matches the available functional robot platforms to the tasks to be performed (step 734) and develops a task schedule (step 735). Each task may be divided into subtasks in order to minimize navigator movement and increase efficiency.

Figure 7C:
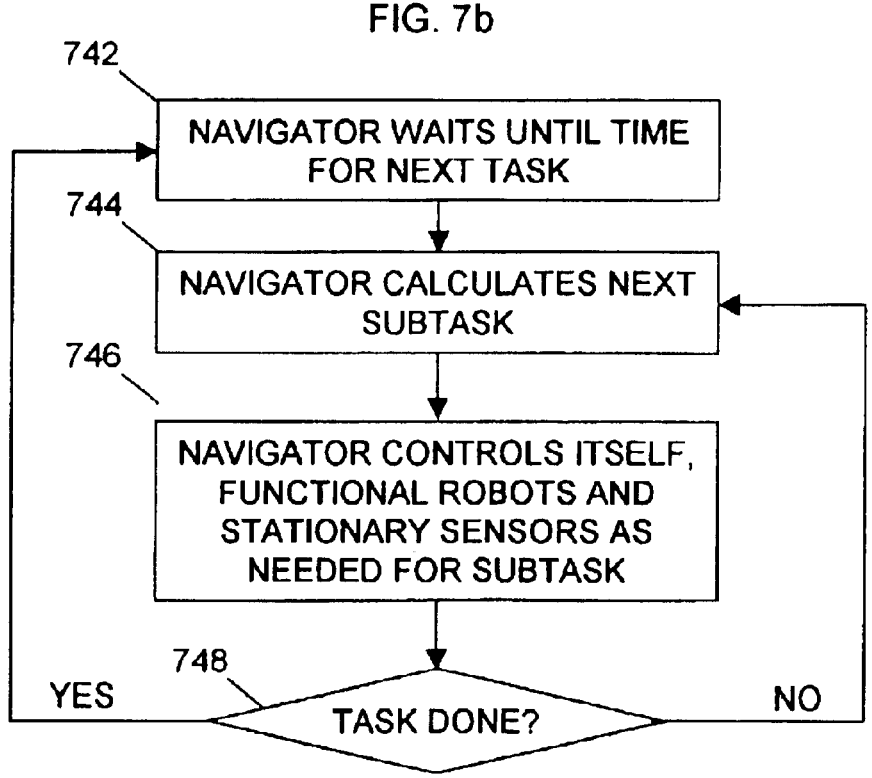
FIG. 7c is a flow diagram illustrating one method by which the navigator platform controls and tracks functional robot platforms during task performance.

In one embodiment, navigator platform 110, 1110 controls functional robot platforms 120, 1120 to perform the scheduled tasks. The steps involved in planning and control are illustrated in more detail in FIG. 7c. At step 742, navigator platform 110, 1110 waits for the time (according to the task schedule developed as described above) to begin performing the next scheduled task. At or before the time arrives for the next task, in step 744, navigator platform 110, 1110 recursively calculates the next lowest level subtask. Examples of lowest level subtasks include turning on motors and tracking a robot until an event occurs. The navigator moves itself or moves and/or controls the appropriate functional robot platform(s) to perform each subtask (step 746). Navigator platform 110, 1110 issues appropriate control signals 209 to functional robot platforms 120, 1120 via its transmitter 208 (see FIGS. 3a-3f). This planning and control loop is iterated until the entire task is complete (decision node 748).

Navigator platform 110, 1110 directs functional robot platforms 120, 1120 along the planned routes using the functional robot platforms' control loops. As described above, in one embodiment, the control loop for moving and maneuvering robot 120, 1120 comprises power source and power supply system 402, motor controller 404, motor 406 and wheels 408. Control signals received from navigator platform 110, 1110 via receiver 302 direct motor controller 404. Controller 404 controls motor 406, which in turn drives wheels 408. The control loop may also comprise servos, actuators, transmitters and the like.

Figure 5:
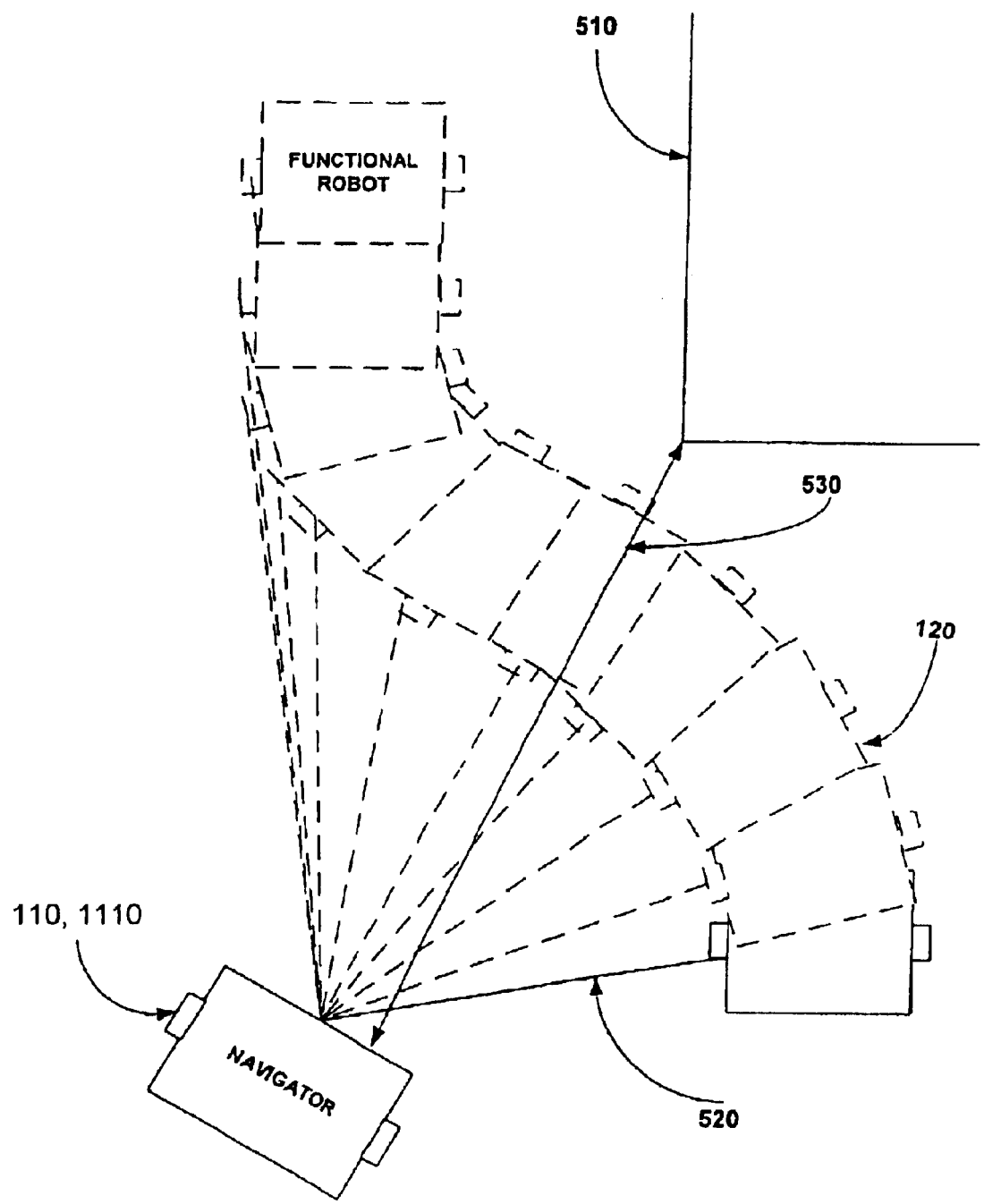
FIG. 5 is a block diagram depicting a navigator as it maneuvers a functional robot platform around an obstacle.

While functional robot platform 120, 1120 is moving, in one embodiment, navigator platform 110, 1110 remains stationary and tracks the functional robot platform's progress. A number of suitable tracking algorithms will be familiar to those of ordinary skill in the art. Keeping navigator platform 110, 1110 stationary vastly reduces the localization computational overhead associated with the tracking algorithms. Moreover, use of a stationary navigator reduces delays associate with navigating around unforeseen obstacles. Navigator platform 110, 1110 can first use a functional robot platform to test the planned route. If a collision occurs, navigator platform 110, 1110 still knows its own position and can track the position of the functional robot platform as it directs it to travel an alternate path. As shown in FIG. 5, navigator platform 110, 1110 can "see" obstacles 510 via sensor input 530 from sensors on board navigator platforms 1110, functional robot platforms 1120, or stationary sensor platforms 124 and can direct a functional robot platform 120, 1120 around the obstacle 510 via control loops 520. This is far less computationally intensive than if navigator platform 110, 1110 itself needed to perform the tasks of a functional robot platform, or if the functional robot platform 120, 1120 needed to perform the tracking process.

In one embodiment, navigator platform 110, 1110 is able to track and control the functional robot platforms while the functional robot platforms are moving at rates substantially faster than that found in conventional systems. In particular, in one embodiment, the system is capable of movement at a rate substantially faster than one foot per second per 1,000 MIPS. Additionally, navigator platform 110, 1110 may have sufficient processing power to perform some or all mapping and localization functions while simultaneously tracking and controlling the functional robot platforms.

Eventually, navigator platform 110 may need to reposition itself in order to continue tracking functional robot platforms 120, 1120 via sensors on board other functional robot platforms 1120 or stationary sensor platforms 124. Typically, this will occur when the working functional robot platforms 120, 1120 need to move far away or have moved out of view of the sensors currently being used for tracking. When navigator platform 110 determines that it needs to reposition itself, in one embodiment, it commands the working functional robot platforms 120, 1120 to cease movement, and then moves, using functional robot platforms 120, 1120 and/or stationary sensor platforms 124 as landmarks.

Similarly, navigator platform 1110 may need to be relocated in order to continue tracking functional robot platforms 120, 1120 via sensors on board itself or other navigator platforms 1110, other functional robot platforms 1120, or stationary sensor platforms 124. Typically, this will occur for the same reasons described above for moving navigator platform 110. Nevertheless, it should be noted for both types of navigator platforms 110, 1110, that the use of sensors on functional robot platforms 1120 and multiple stationary sensors will generally preclude the need to relocate navigator 120, 1120.

Figure 6:
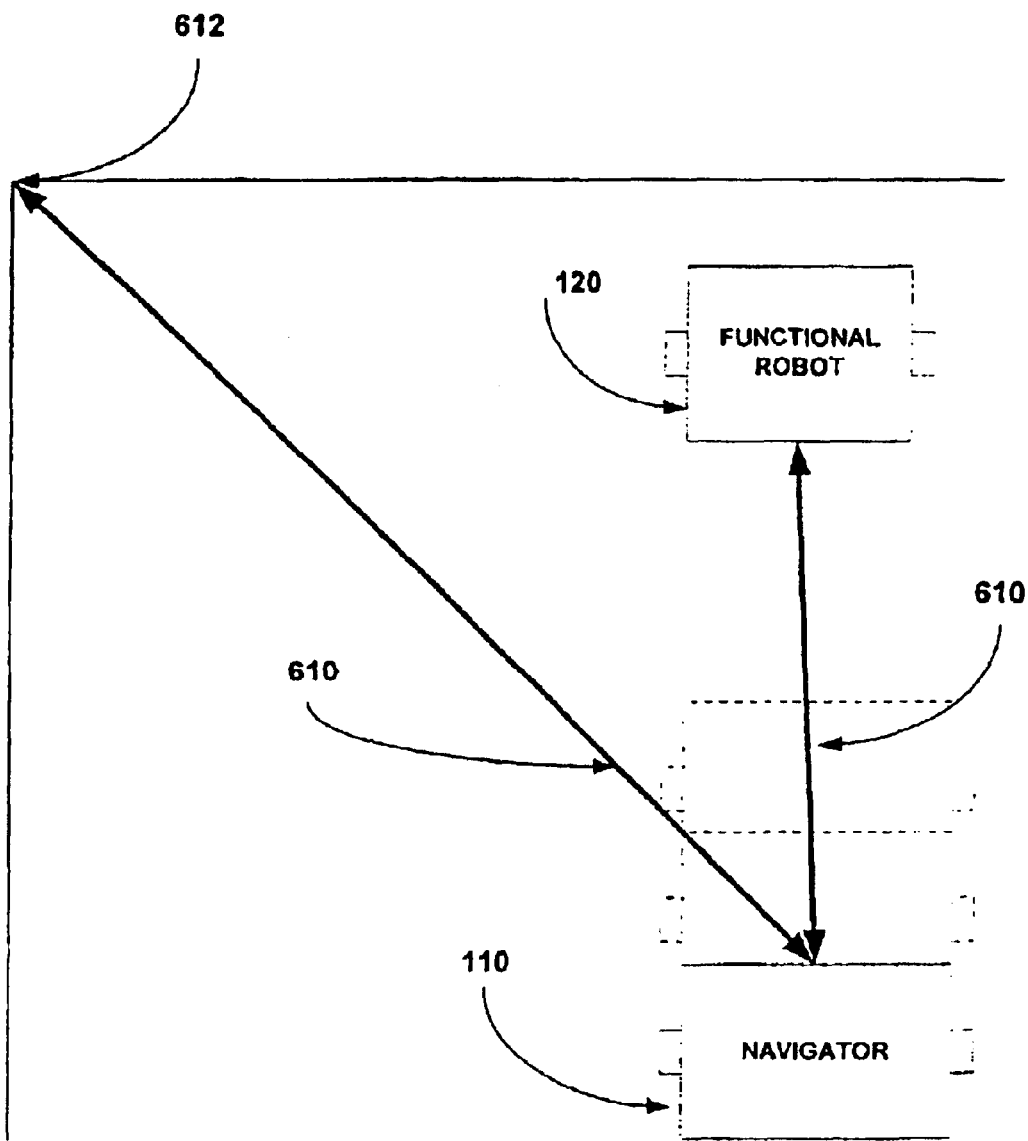
FIG. 6 is a block diagram depicting an embodiment of a navigator platform as it maneuvers itself toward a functional robot platform.

As shown in FIG. 6, in one implementation, when navigator platform 110 is moving, it uses sensor input 610 from sensors on board navigator platforms 1110, functional robot platforms 1120, or stationary sensor platforms 124 to triangulate on a functional robot platform 120, 1120 and another landmark 612 such as the corner of a room or window. Using this data, navigator platform 110 then moves into proper position. When navigator platform 110 arrives at the new location, it undertakes dynamic mapping and localization (as described above) to ensure that it knows where it is. This process may take several minutes as landmarks may be distant or obscured, and errors may be present in the map or location data. This iterative process is relatively quick compared to traditional methods, since at least one landmark having precisely known dimensions is normally nearby navigator platform 110. Once navigator platform 110 has moved sufficiently close to functional robot platforms 120, 1120, in one implementation, the method returns to step 744 (FIG. 7c) and navigator platform 110 calculates the next subtask to further task performance. The recursive calculation of subtasks is based on algorithms that minimize the movement of the navigator.

In one implementation, navigator platform 110, 1110 tracks the functional robot platform(s) as they perform the tasks. For example, navigator platform 110, 1110 can use a motion model of the movement required by the task to assist in tracking the robots. The motion model comprises the expected linear and angular velocities and accelerations of the functional robot platforms for a given surface type and set of inputs to the robot's motors and actuators. Once the motion model provides a rough estimate of the functional robot platform's location, navigator platform 110, 1110 can use sensors on board navigator platforms 1110, functional robot platforms 1120, or stationary sensor platforms 124 to obtain more accurate data. Various filtering algorithms may be used to filter motion model errors. In one implementation, Kalman filtering is used. Other suitable filtering algorithms known to those of ordinary skill in the art, such as g-h and Benedict-Bordner, may also be used. In essence, x-y and orientation data is tracked and the filtering algorithm reduces errors due to the motion model and sensor input.

At decision node 748 (FIG. 7c), navigator platform 110, 1110 determines whether the entire task or subtask is complete. If the task is complete, the method returns to step 742 and navigator platform 110, 1110 waits for the time to begin the next task or subtask. In one implementation, completion of the task includes the navigator platform 110, 1110 and functional robot platforms returning to a base station 130 (FIG. 1) for recharging. In this regard, it is noted that throughout movement and task performance, navigator platform 110, 1110 may estimate or monitor the power levels of the functional robot platforms and return them for recharging as needed.

In moving and performing their tasks, some functional robot platforms, such as vacuum cleaners, may require power from wall outlets rather than from a self-contained power supply. In a system using such robots, navigator platform 110, 1110 and the functional robot platform may work as a team to locate a wall outlet and plug the functional robot platform into the outlet. When the functional robot platform(s) need to move too far from a particular outlet, navigator platform 110, 1110 and the functional robot platforms can unplug from that outlet and move to another.

Several embodiments of the invention have been shown and described above. Alternate embodiments of the invention are also envisioned. For example, another embodiment of the invention contemplates use of more than one navigator platform 110, 1110. In this embodiment, a first set of platforms (i.e., navigator platforms 110, 1110, functional robot platforms 1120, and stationary sensor platforms 124) is responsible for all or substantially all mapping, localization, planning and control functions, and a second or functional set of platforms is responsible for functional task completion. The first set of platforms, then, is responsible for planning, navigating and tracking task performance by the second set. This embodiment of the invention may be appropriate where there are too many functional robot platforms for one navigator to command and control, or where the functional robot platforms are spread out over a particularly large geographic area.

Finally, in any of the foregoing embodiments, any stationary or mobile platform could be dedicated to perform some or all of the processing and computation. In such a configuration, any platform may be equipped with appropriate sensors for gathering data. The sensor data, either raw or partially processed, may be transmitted to a dedicated stationary or mobile platform for further processing via a wireless network or any other suitable means for communication. The dedicated platform may perform the computations, and communicate the results to a navigator.

Figure 8A:
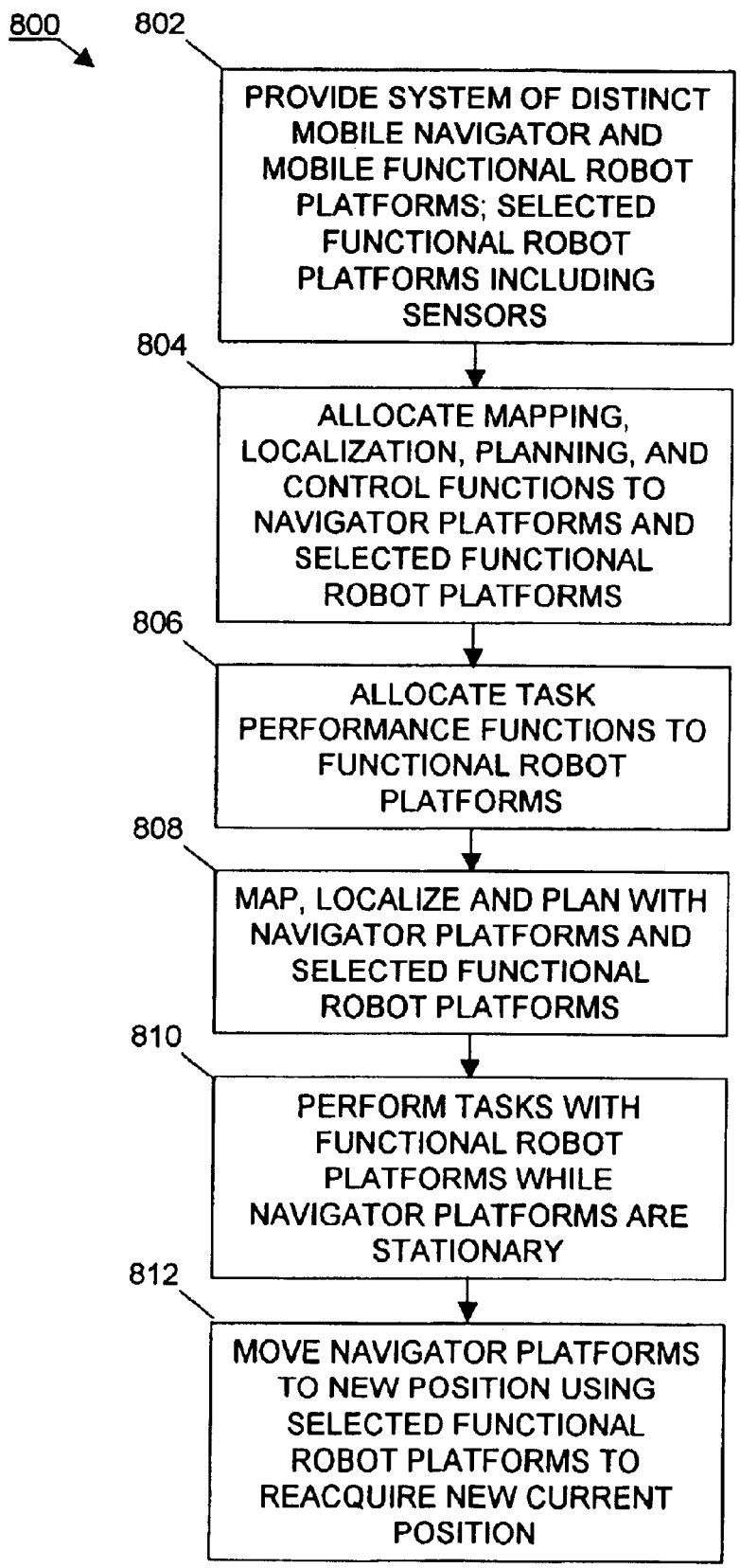
FIG. 8a is a flow diagram showing one method of implementing an autonomous multi-platform robot system according to one embodiment of the invention.

In reference to FIG. 8a, a flow diagram showing one method 800 of implementing an embodiment of an autonomous multi-platform robot system 100 is provided. In step 802, an autonomous system comprising distinct mobile navigator platforms and mobile functional platforms is provided, wherein one or more of the functional platforms include sensors (i.e., selected functional platforms). In step 804, the functions of mapping, localization, planning and control are assigned to at least one navigator platform and at least one selected functional platform.

In step 806, the responsibility for functional task completion is assigned to at least one functional platform. In step 808, the navigator platforms and selected functional platforms map the environment, localize all robots within the environment and plan a task performance schedule. In step 810, the navigators may remain stationary while controlling the functional platforms to perform the assigned tasks. The assigned tasks may be subdivided into smaller tasks to facilitate easier tracking and to limit the need to relocate the navigators. In step 812, which is optional, the navigators may move to a new position using selected functional platforms to reacquire the new current position.

Figure 8B:
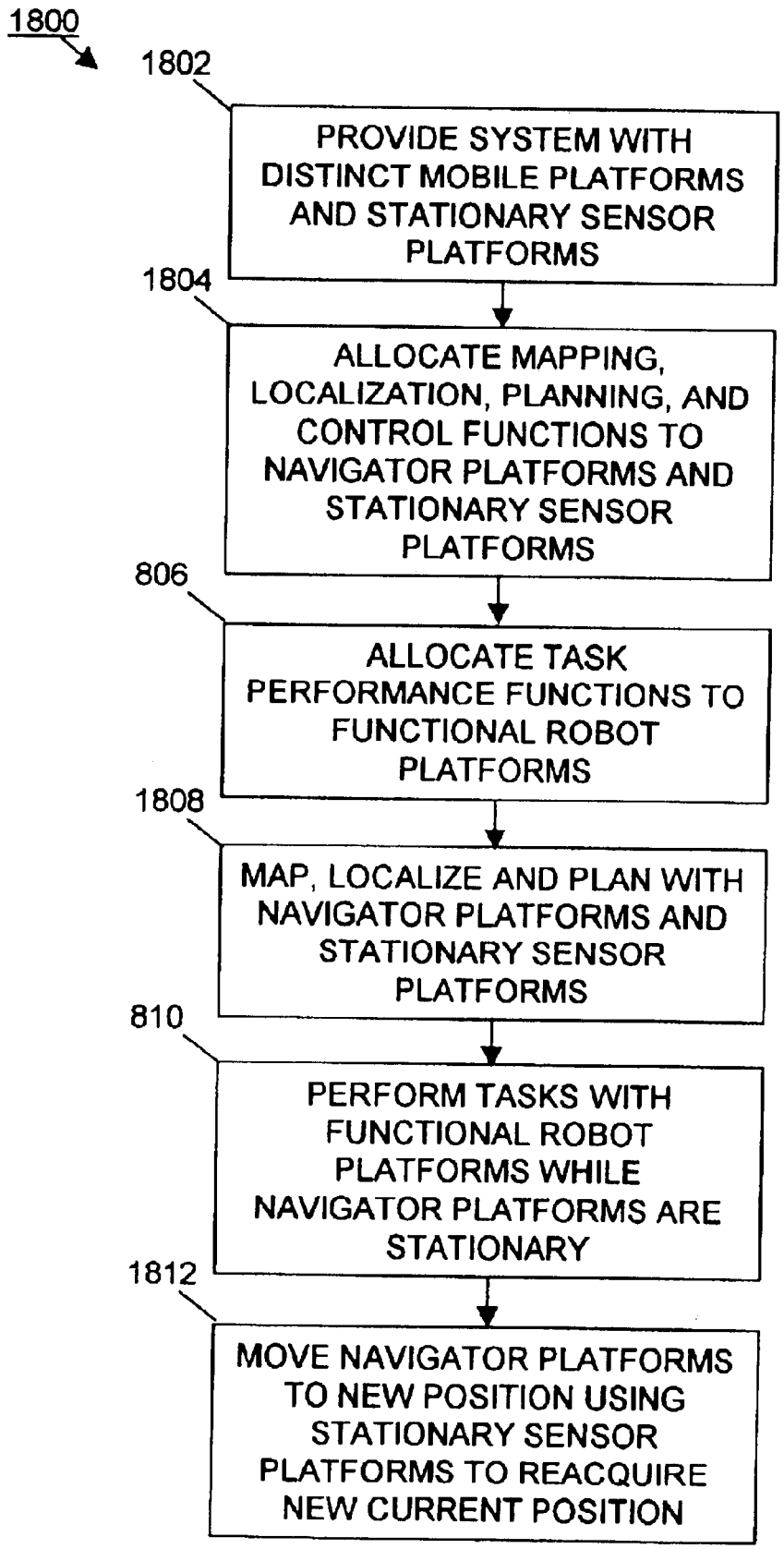
FIG. 8b is a flow diagram showing another method of implementing an autonomous multi-platform robot system according to another embodiment of the invention.

In reference to FIG. 8b, a flow diagram showing another method 1800 of implementing an embodiment of an autonomous multi-platform robot system 100 is provided. In step 1802, an autonomous system comprising distinct mobile navigator platforms, mobile functional platforms, and stationary sensor platforms is provided. In step 1804, the functions of mapping, localization, planning and control are assigned to at least one navigator platform and at least one stationary sensor platform.

In step 806, the responsibility for functional task completion is assigned to at least one functional platform. In step 1808, the navigator platforms and stationary sensor platforms map the environment, localize all robots within the environment and plan a task performance schedule. In step 810, the navigators may remain stationary while controlling the functional platforms to perform the assigned tasks. The assigned tasks may be subdivided into smaller tasks to facilitate easier tracking and to limit the need to relocate the navigators. In step 1812, which is optional, the navigators may move to a new position using stationary sensor platforms to reacquire the new current position.

Figure 10A:
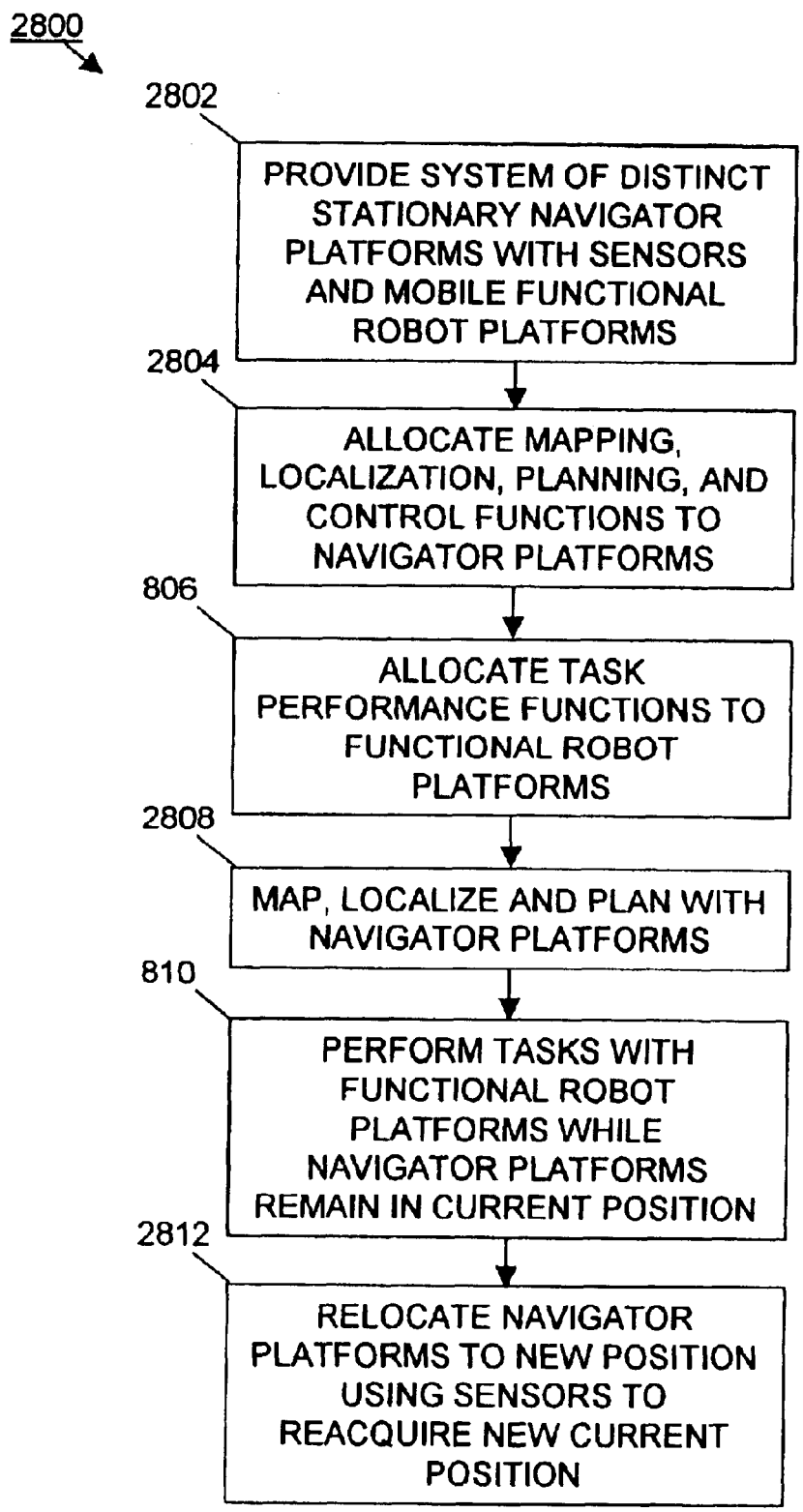
FIGS. 10a–c is a set of flow diagrams showing three methods of implementing an autonomous multi-platform robot system in accordance with another embodiment of the invention.

In reference to FIG. 10a, a flow diagram showing one method 2800 of implementing an embodiment of an autonomous multi-platform robot system 1100 is provided. In step 2802, an autonomous system comprising distinct stationary navigator platforms with sensors and mobile functional platforms is provided. In step 2804, the functions of mapping, localization, planning and control are assigned to at least one navigator platform.

In step 806, the responsibility for functional task completion is assigned to at least one functional platform. In step 2808, the navigator platforms map the environment, localize all robots within the environment and plan a task performance schedule. In step 810, the navigators may remain stationary while controlling the functional platforms to perform the assigned tasks. The assigned tasks may be subdivided into smaller tasks to facilitate easier tracking and to limit the need to relocate the navigators. In step 2812, which is optional, the navigators may be relocated to a new position using on-board sensors to reacquire the new current position.

Figure 10B:
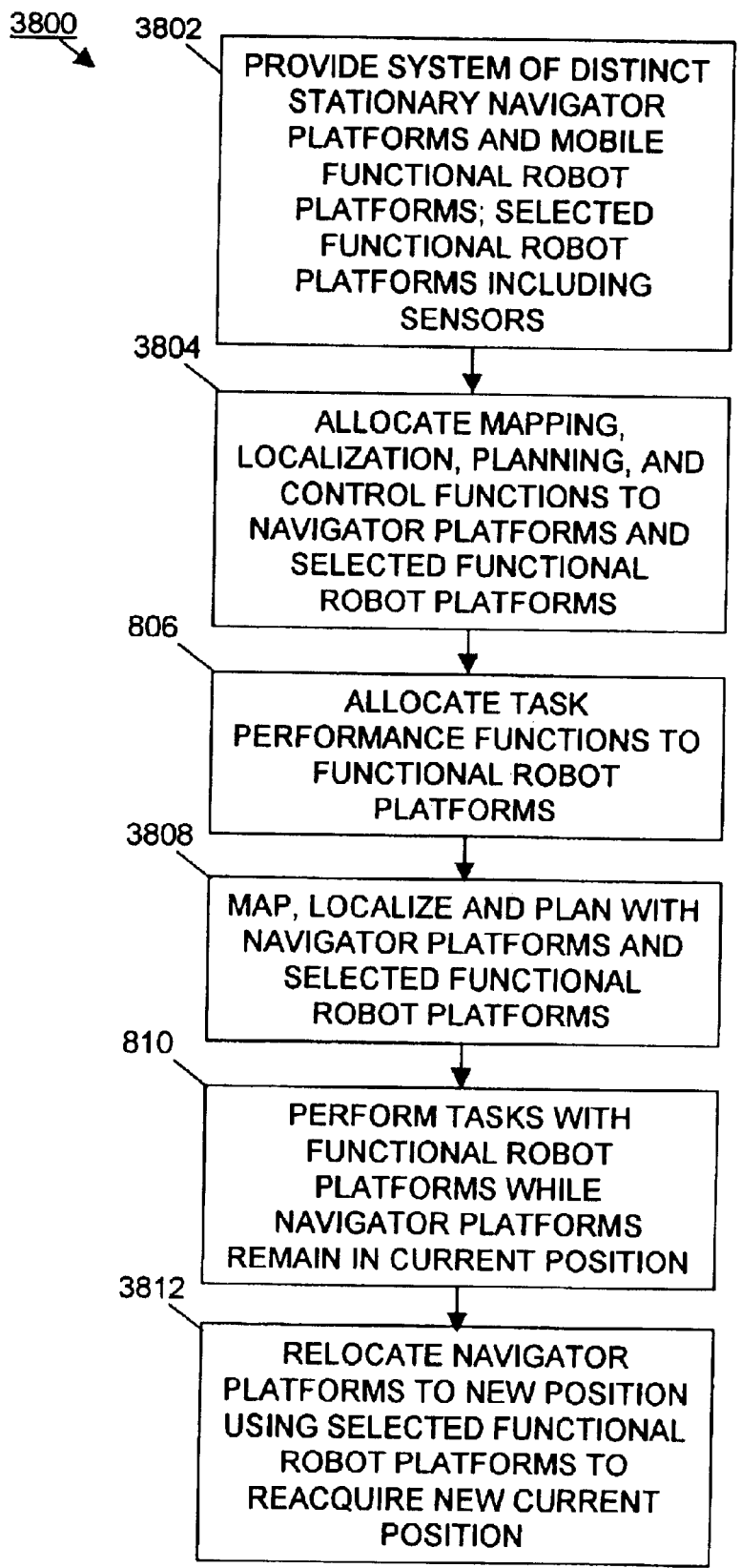

In reference to FIG. 10b, a flow diagram showing another method 3800 of implementing an embodiment of an autonomous multi-platform robot system 1100 is provided. In step 3802, an autonomous system comprising distinct stationary navigator platforms and mobile functional platforms is provided, wherein one or more of the functional platforms include sensors (i.e., selected functional platforms). In step 3804, the functions of mapping, localization, planning and control are assigned to at least one navigator platform and at least one selected functional platform.

In step 806, the responsibility for functional task completion is assigned to at least one functional platform. In step 3808, the navigator platforms and selected functional platforms map the environment, localize all robots within the environment and plan a task performance schedule. In step 810, the navigators may remain stationary while controlling the functional platforms to perform the assigned tasks. The assigned tasks may be subdivided into smaller tasks to facilitate easier tracking and to limit the need to relocate the navigators. In step 3812, which is optional, the navigators may be relocated to a new position using selected functional platforms to reacquire the new current position.

Figure 10C:
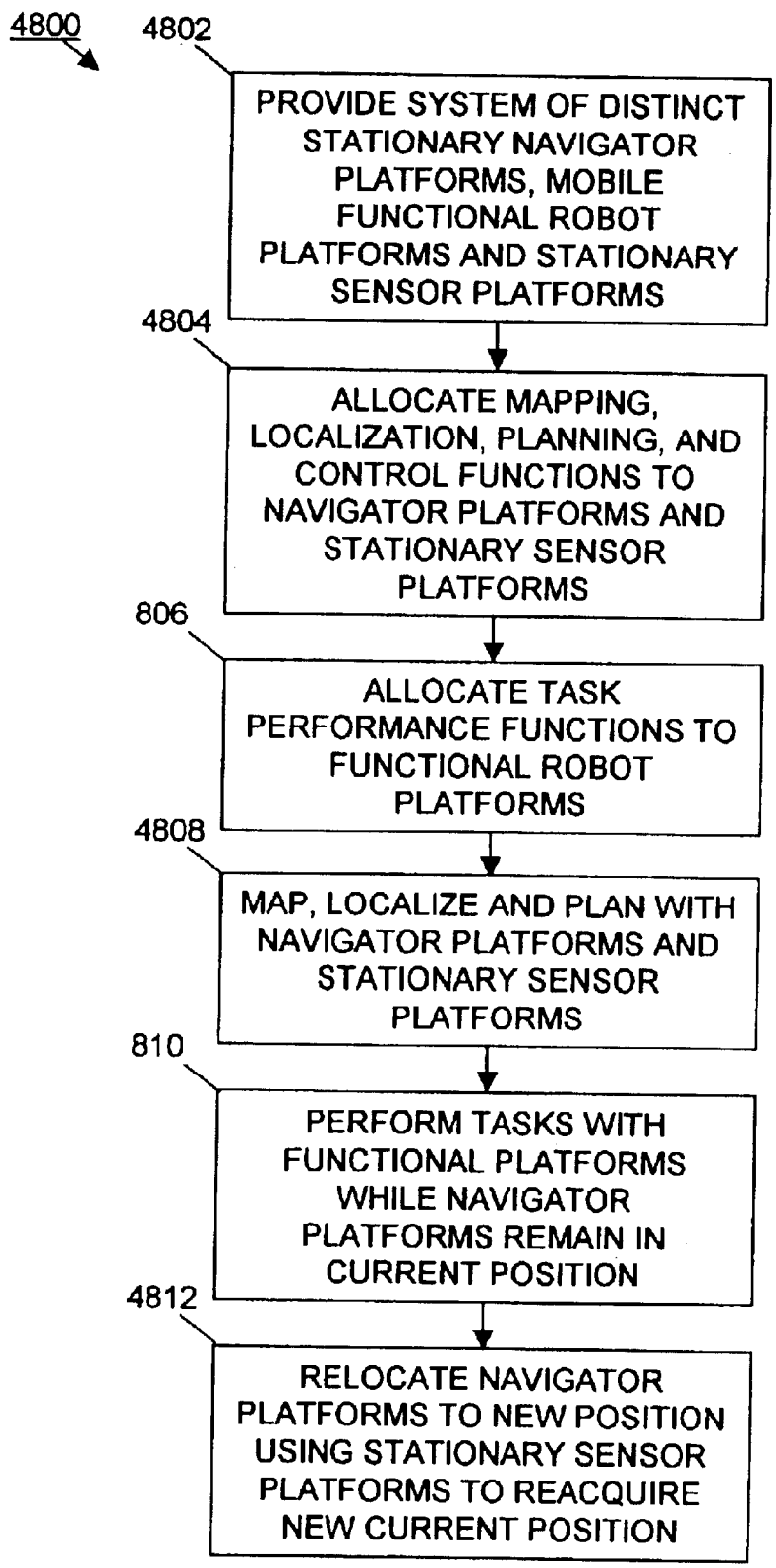

In reference to FIG. 10c, a flow diagram showing yet another method 4800 of implementing an embodiment of an autonomous multi-platform robot system 1100 is provided. In step 4802, an autonomous system comprising distinct stationary navigator platforms, mobile functional platforms, and stationary sensor platforms is provided. In step 4804, the functions of mapping, localization, planning and control are assigned to at least one navigator platform and at least one stationary sensor platform.

In step 806, the responsibility for functional task completion is assigned to at least one functional platform. In step 4808, the navigator platforms and stationary sensor platforms map the environment, localize all robots within the environment and plan a task performance schedule. In step 810, the navigators may remain stationary while controlling the functional platforms to perform the assigned tasks. The assigned tasks may be subdivided into smaller tasks to facilitate easier tracking and to limit the need to relocate the navigators. In step 4812, which is optional, the navigators may be relocated to a new position using stationary sensor platforms to reacquire the new current position.

Figures 11, 12:
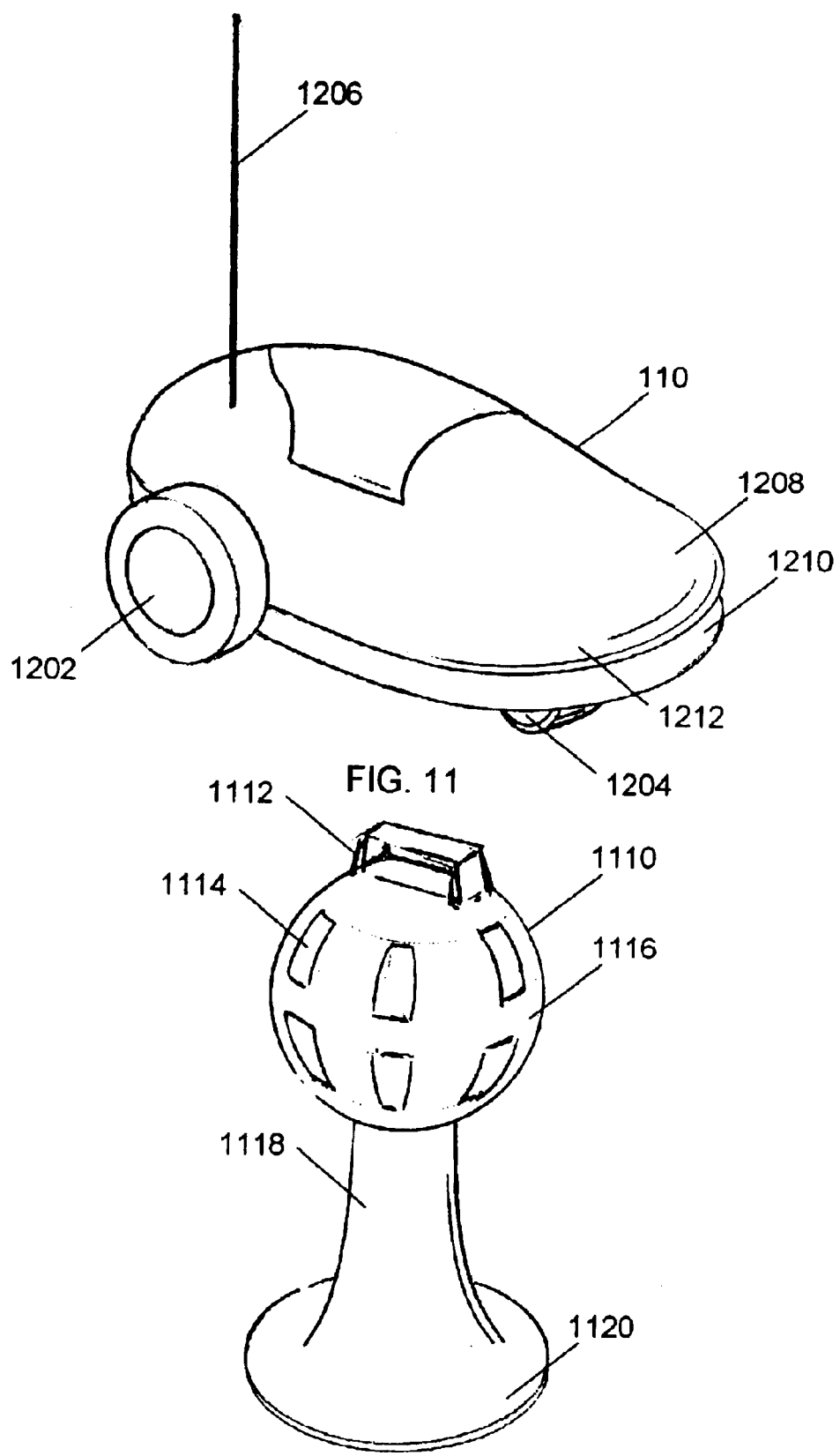
FIG. 11 is a stylized drawing of one embodiment of a mobile navigator platform of the robot system.
FIG. 12 is a stylized drawing of another embodiment of a stationary navigator platform of the robot system.

FIGS. 11–16 provide stylized drawings of the various platforms of the multiple embodiments of autonomous multi-platform robot system 100, 1100 described above. More specifically, FIG. 11 provides a stylized drawing of an embodiment of a mobile navigator platform 110. It includes back wheels 1202 and a front wheel 1204, as well as a communication antenna 1206 mounted on a housing 1208. Note the use of a bumper 1210 positioned at a forward end 1212 of the navigator platform 110.

FIG. 12 provides a stylized drawing of an embodiment of a stationary navigator platform 1110. Note that the navigator platform 1110 includes a plurality of sensors 1114 and the handle 1112. The sensors 1114 are held in a ball shaped housing 1116 mounted on a stem 1118 supported on a base 1120. In this way, the platform is spaced from the subjacent floor surface and can more easily communicate with the other navigator platforms 110, 1110, functional robot platforms 120, 1120, and/or stationary sensor platforms 124.

Figure 13:
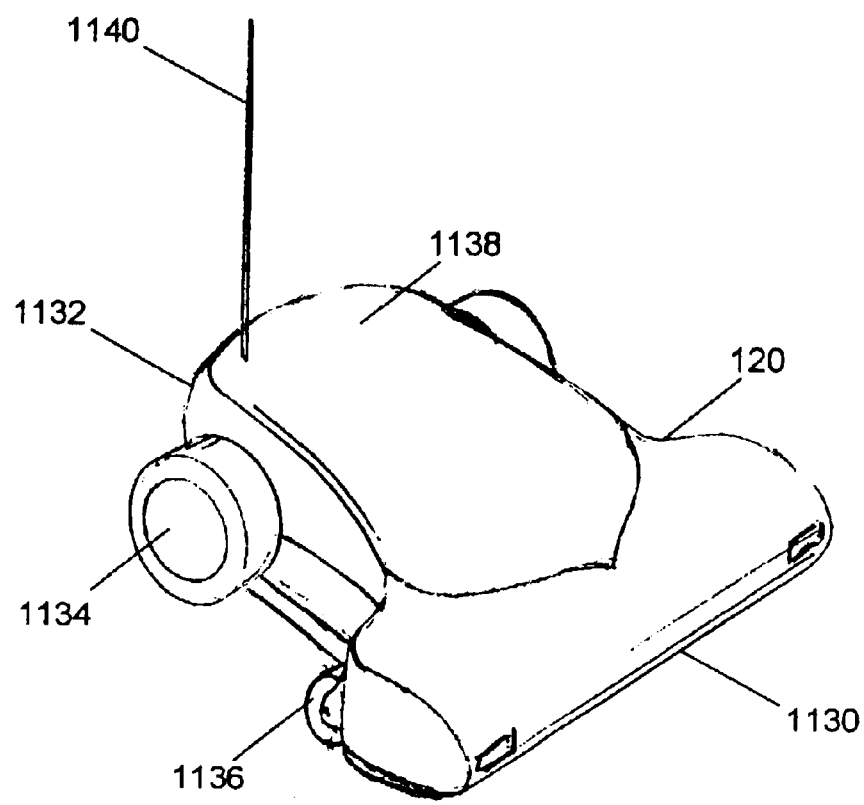
FIG. 13 is a stylized drawing of one embodiment of a functional robot platform of the robot system.

FIG. 13 provides a stylized drawing of an embodiment of a mobile functional robot platform 120. The functional robot platform 120 can include a suction nozzle 1130 at a front end of a housing 1132, which is supported by motorized rear wheels 1134 and front casters 1136. A filter compartment 1138 is located rearwardly of the nozzle 1130, as is a communications antenna 1140. Not visible in FIG. 13 is a motor/fan and, if desired, a brush roller of the functional robot platform 120.

Figure 14:
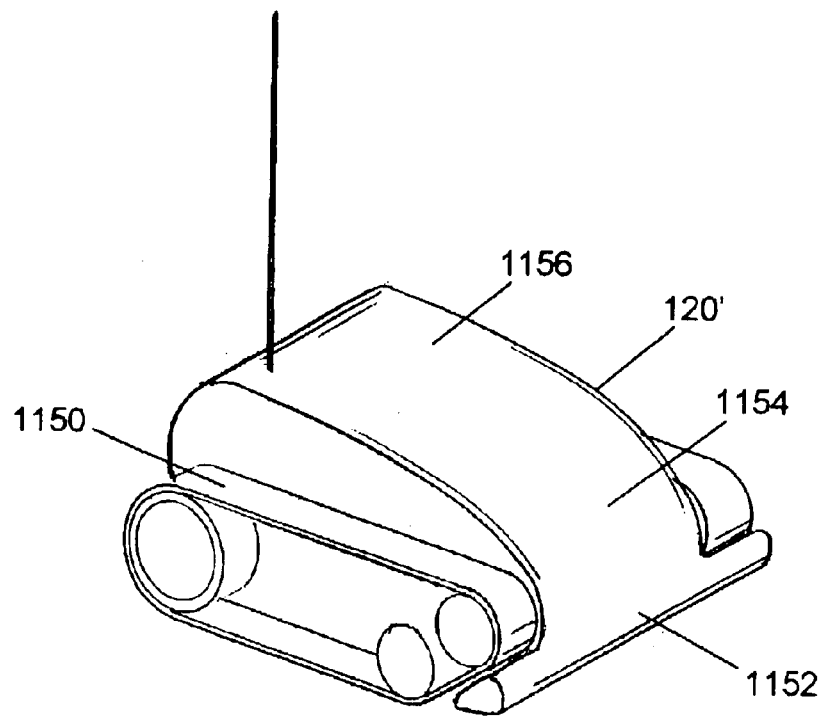
FIG. 14 is a stylized drawing of another embodiment of a functional robot platform of the robot system.

FIG. 14 provides a stylized drawing of another embodiment of a mobile functional robot platform 120'. In this embodiment, a drive means in the form of a motorized track assembly 1150 is used instead of the motorized wheels 1134 illustrated in FIG. 13. Also provided is a nozzle 1152 at the front end of a housing 1154, to which a pair of the track assemblies 1150 are mounted. The nozzle 1152 communicates with a filter compartment 1156.

Figure 15:
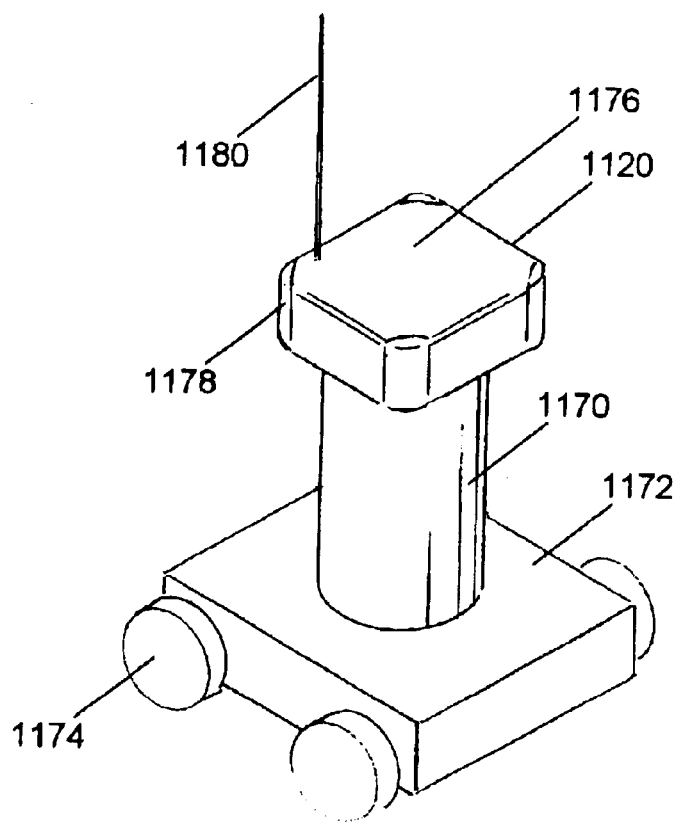
FIG. 15 is a stylized drawing of yet another embodiment of a functional robot platform of the robot system.

FIG. 15 provides a stylized drawing of an embodiment of a mobile functional robot platform 1120. Note that functional robot platform 1120 includes sensors a column 1170 extending upwardly from a housing 1172 supported on four wheels 1174, one at each corner of the approximately rectangular housing. The column 1170 supports a sensor housing 1176 which can contain sensors 1178 at each corner of a somewhat square-shaped body, which also sports an antenna 1180.

Figure 16:
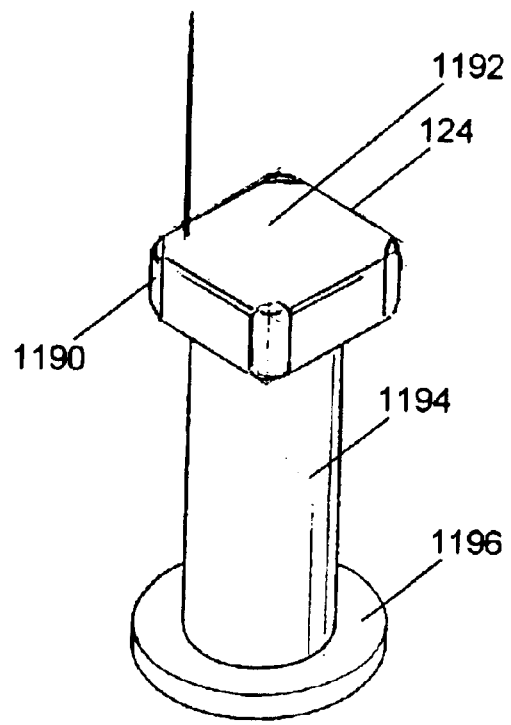
FIG. 16 is a stylized drawing of an embodiment of a stationary sensor platform of the robot system.

FIG. 16 provides a stylized drawing of an embodiment of a stationary sensor platform 124. Note that stationary sensor platform 124 includes sensors 1190 mounted in a sensor housing 1192 supported on a stem 1194 held on a base 1196.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

What is claimed is:

1. An autonomous multi-platform robot system for performing at least one functional task in an environment, the system including:
    at least one functional robot platform;
    at least one navigator platform providing mapping, localization, planning, and control functions for itself and said at least one functional robot platform; and
    wherein said at least one functional robot platform senses information about the environment and communicates such information to said at least one navigator platform for consideration in the mapping, localization, planning, and control functions provided by the at least one navigator platform.

2. The system as set forth in claim 1, wherein the at least one navigator platform includes:
    a receiver for receiving communications, including environmental data, from the at least one functional robot platform;
    a controller in communication with the receiver for providing mapping, localization, planning, and control processes for the navigator platform and the at least one functional robot platform; and
    a transmitter in communication with the controller for transmitting control signals and other communications to the at least one functional robot platform within the environment.

3. The system as set forth in claim 2, wherein the at least one navigator platform further includes:
    drive means in communication with the controller for moving the navigator platform around within the environment.

4. The system as set forth in claim 1, wherein the at least one functional robot platform includes:
    a receiver for receiving control signals and other communications from the at least one navigator platform;
    drive means for moving the at least one functional robot platform around within the environment;
    at least one sensor for sensing the information about the environment that is communicated to the at least one navigator platform for consideration in the mapping, localization, planning, and control functions provided by the at least one navigator platform;
    a controller in communication with the receiver, drive means, and sensor(s) for controlling the drive means and sensor(s) in response to control signals; and
    a transmitter in communication with the controller for transmitting environmental data and other communications to the at least one navigator platforms within the environment.

5. The system as set forth in claim 4 wherein the at least one functional robot platform also performs at least one functional task.

6. The system as set forth in claim 1, further including:
    at least one stationary sensor platform in communication with the at least one navigator platforms for sensing information about the environment and communicating such information to the at least one navigator platform for consideration in the mapping, localization, planning, and control functions provided by the at least one navigator platform;
    wherein the at least one stationary sensor platform is spaced from the at least one navigator platform.

7. The system as set forth in claim 6, wherein the at least one stationary sensor platform includes:
    a receiver for receiving control signals and other communications from the at least one navigator platform;
    at least one sensor for sensing the information about the environment that is communicated to the at least one navigator platform for consideration in the mapping, localization, planning, and control functions provided by the at least one navigator platform;
    a controller in communication with the receiver and sensor(s) for controlling the at least one sensor in response to the control signals; and
    a transmitter in communication with the controller for transmitting environmental data and other communications to the at least one navigator platform.

8. The system as set forth in claim 1, wherein the at least one functional robot platform includes:
    a receiver for receiving control signals and other communications from the at least one navigator platform;
    drive means for moving the at least one functional robot platform around within the environment;
    at least one sensor for sensing the information about the environment that is communicated to the at least one navigator platform for consideration in the mapping, localization, planning, and control functions provided by the at least one navigator platform;
    a controller in communication with the receiver, drive means, and sensor(s) for controlling the drive means in response to control signals; and a transmitter in communication with the controller for transmitting environmental data and other communications to the at least one navigator platform within the environment.

9. A multi-platform robot system for performing functional tasks in an environment, the system including:
   a functional robot platform;
   a navigator platform providing mapping, localization, planning, and control functions for itself and said functional robot platform;
   wherein the functional robot platform is in communication with the navigator platform for performing one or more functional tasks; and
   a stationary sensor platform in communication with the navigator platform, the functional robot platform providing control functions for said stationary sensor platform;
   wherein said stationary sensor platform is separate from said navigator platform and senses information about the environment and communicates such information to said navigator platform for consideration in the manning, localization, planning, and control functions provided by said navigator platform.

10. The system as set forth in claim 9, the navigator platform including:
    a receiver for receiving communications, including environmental data, from the stationary sensor platform;
    a controller in communication with the receiver for providing mapping, localization, planning, and control processes for the navigator platform and the functional robot platform and control processes for the stationary sensor platform; and
    a transmitter in communication with the controller for transmitting control signals and other communications to the functional robot platform and the stationary sensor platform.

11. The system as set forth in claim 10, the navigator platform further including:
    drive means in communication with the controller for moving the navigator platform around within the environment.

12. The system as set forth in claim 9, functional robot platform including:
    a receiver for receiving control signals and other communications from the navigator platform within the environment; and
    drive means for moving the functional robot platform around within the environment in response to the control signals.

13. The system as set forth in claim 9, stationary sensor platform including:
    a receiver for receiving control signals and other communications from the navigator platform within the environment;
    at least one sensor for sensing the information about the environment that is communicated to the navigator platform for consideration in the mapping, localization, planning, and control functions provided by the navigator platform;
    a controller in communication with the receiver and sensor(s) for controlling the sensor(s) in response to the control signals; and
    a transmitter for transmitting environmental data and other communications to the navigator platform.

14. A robot system for performing one or more functional tasks in an environment, the system including:
    at least one functional robot platform; and
    at least one navigator platform providing mapping, localization, planning, and control functions for itself and said at least one functional robot platform;
    wherein said at least one functional robot platform includes first means for sensing information about the environment and second means for communicating such information to said at least one navigator platform;
    wherein the mapping, localization, planning, and control functions provided by the at least one navigator platform are based at least in part on the information about the environment from the at least one functional robot platform.

15. The system as set forth in claim 14, the at least one navigator platform including:
    at least one sensor for sensing information about the environment that is utilized in the mapping, localization, planning, and control functions provided by the at least one navigator platform;
    a controller in communication with the sensor(s) for providing mapping, localization, planning, and control processes for the navigator platform and other platforms within the environment; and
    a transmitter in communication with the controller for transmitting control signals and other communications to one or more other platforms within the environment.

16. The system as set forth in claim 14, the at least one functional robot platform further including:
    a receiver for receiving control signals and other communications from one or more stationary navigator platforms within the environment; and
    drive means for moving the at least one functional robot platform around within the environment in response to the control signals.

17. The system as set forth in claim 14, the at least one functional robot platform further including:
    a receiver for receiving control signals and other communications from one or more navigator platforms within the environment;
    drive means for moving the at least one functional robot platform around within the environment;
    at least one sensor for sensing the information about the environment that is communicated to the at least one navigator platform for consideration in the mapping, localization, planning, and control functions provided by the at least one navigator platform;
    a controller in communication with the receiver, drive means, and sensor(s) for controlling the drive means and sensor(s) in response to the control signals; and
    a transmitter in communication with the controller for transmitting environmental data and other communications to one or more navigator platforms within the environment.

18. The system as set forth in claim 14, further including:
    at least one stationary sensor platform separately spaced from the at least one navigator platform and in communication with one or more navigator platforms for sensing information about the environment and communicating such information to the at least one navigator platform for consideration in the mapping, localization, planning, and control functions provided by the at least one navigator platform.

19. The system as set forth in claim 18, the at least one stationary sensor platform including:
- a receiver for receiving control signals and other communications from one or more navigator platforms within the environment;
- at least one sensor for sensing the information about the environment that is communicated to the at least one navigator platform for consideration in the mapping, localization, planning, and control functions provided by the at least one navigator platform;
- a controller in communication with the receiver and sensor(s) for controlling the sensor(s) in response to the control signals; and
- a transmitter for transmitting environmental data and other communications to one or more navigator platforms within the environment.

20. The system as set forth in claim 14, further including:
- at least one mobile navigator platform in communication with at least one other platform for providing mapping, localization, planning, and control functions for itself and at least one other platform within the environment.

21. The system as set forth in claim 20, the mobile navigator platform including:
- a receiver for receiving communications from other platforms within the environment, including environmental data from at least one of one or more functional robot platforms and one or more stationary navigator platforms;
- drive means for moving the mobile navigator platform around within the environment;
- a controller in communication with the receiver and drive means for providing mapping, localization, planning, and control processes for the navigator platform and other platforms within the environment; and
- a transmitter in communication with the controller for transmitting control signals and other communications to other platforms within the environment.

* * * * *